(12) United States Patent
Deyaf et al.

(10) Patent No.: US 9,739,440 B1
(45) Date of Patent: Aug. 22, 2017

(54) VEHICLE ILLUMINATION APPARATUS HAVING ADJUSTABLE MODULAR OPTICAL UNITS

(71) Applicant: Feniex Industries, Inc., Austin, TX (US)

(72) Inventors: Hamza Deyaf, Austin, TX (US); Nicholas Mazzanti, Austin, TX (US)

(73) Assignee: Feniex Industries, Inc., Austin, TX (US)

( * ) Notice: Subject to any disclaimer, the term of this patent is extended or adjusted under 35 U.S.C. 154(b) by 0 days.

(21) Appl. No.: 15/413,657

(22) Filed: Jan. 24, 2017

(51) Int. Cl.
| | |
|---|---|
| *F21V 14/06* | (2006.01) |
| *F21S 8/10* | (2006.01) |
| *F21S 2/00* | (2016.01) |
| *F21Y 115/10* | (2016.01) |

(52) U.S. Cl.
CPC .......... *F21S 48/1757* (2013.01); *F21S 2/005* (2013.01); *F21S 48/1154* (2013.01); *F21S 48/1225* (2013.01); *F21S 48/1329* (2013.01); *F21S 48/15* (2013.01); *F21S 48/1721* (2013.01); *F21S 48/328* (2013.01); *F21Y 2115/10* (2016.08)

(58) Field of Classification Search
CPC ...... F21V 14/006; F21V 14/06; F21V 14/065; F21V 17/02; F21S 48/1721; B60Q 1/061; B60Q 1/0681; B60Q 1/076
See application file for complete search history.

(56) References Cited

U.S. PATENT DOCUMENTS

| | | | | |
|---|---|---|---|---|
| 1,478,282 A | * | 12/1923 | Hunter | F21L 4/00 362/187 |
| 2,072,697 A | * | 3/1937 | Woodward | B60Q 1/068 362/249.1 |
| 5,068,768 A | * | 11/1991 | Kobayashi | F21S 48/1233 362/268 |
| 5,584,568 A | * | 12/1996 | Corbasson | F21V 14/06 359/794 |
| 5,630,661 A | * | 5/1997 | Fox | F21L 4/085 362/187 |
| 5,831,777 A | * | 11/1998 | Iwasa | G02B 7/10 359/819 |
| 6,290,368 B1 | * | 9/2001 | Lehrer | F21L 4/06 362/103 |
| 7,896,524 B2 | * | 3/2011 | Yoneda | F21V 5/00 362/231 |
| 8,840,273 B2 | * | 9/2014 | Sooferian | F21V 14/02 362/280 |
| 9,140,431 B1 | * | 9/2015 | Lee | F21V 14/065 |
| 9,423,090 B1 | * | 8/2016 | Deyaf | F21S 48/1757 |
| 9,423,092 B1 | * | 8/2016 | Deyaf | F21S 48/1757 |
| 2015/0211708 A1 | * | 7/2015 | Stavely | F21V 5/007 348/164 |

* cited by examiner

*Primary Examiner* — Ismael Negron

(57) ABSTRACT

An illumination apparatus includes a housing with a faceplate, at least one light source, at least one optical assembly coupled to the faceplate, a frame supporting the at least one light source, and a yoke assembly having a camshaft and a yoke with a set of lobes, the yoke assembly coupled to the faceplate and slideably received by the frame, such that the at least one optical assembly is moveable in a linear direction towards and away from the at least one light source by rotation of the camshaft.

25 Claims, 18 Drawing Sheets

VEHICLE ILLUMINATION APPARATUS HAVING ADJUSTABLE MODULAR OPTICAL UNITS

FIELD OF THE DISCLOSURE

The illustrative embodiments relate generally to one or more embodiments for a light device adapted for use with a vehicle and adapted to provide illumination for a vehicle. Further, the illustrative embodiments relate generally to a light device, whereby one or more properties of the light output emitted from the light source within the light device may be adjusted to suit the lighting needs of a driver.

BACKGROUND

All vehicles need vehicle lights to provide illumination. Such illumination is a necessity when vehicles are driven at night. Further, illumination becomes a necessity in conditions where visibility may be poor, including during inclement weather and/or in locations with limited natural and artificial lighting. Drivers may choose to supplement their vehicles with auxiliary vehicle lights. The added illumination provided by the auxiliary vehicle lights may greatly assist to provide increased visibility of a user's surrounding environment.

SUMMARY

In one aspect, embodiments provided in the present description relate to an apparatus that is a light device adapted to be coupled to a surface of a vehicle, the light device having a housing. In one or more embodiments, the light device includes a set of modular optical units disposed within a housing of the light device, whereby the set of modular optical units further includes at least one light source that is configured to produce a light output and at least one optical assembly. The at least one optical assembly may include at least one optical component that may be coupled to a faceplate. The light device may further include a frame and a yoke assembly. The yoke assembly, according to one or more embodiments, may include a shaft having a set of cams attached to the shaft and a yoke having a set of lobes, whereby the yoke assembly may be coupled to the frame. The at least one optical assembly may be moveable in a linear direction towards and away from the at least one light source. Further, the light output produced by the at least one light source may be adjustable depending on the position of the at least one optical assembly with respect to the at least one light source.

In another aspect, embodiments provided in the present description may relate to a method of operating a light device in a vehicle. In one or more embodiments, a method may include receiving a command to change a position of a set of optical assemblies with respect to a set of light sources, whereby the set of optical assemblies and the set of light sources may be enclosed within a modular optical unit. A modular optical unit, according to embodiments of the present description, may be located within a housing of the light device, whereby the light device being may be coupled to a surface of a vehicle. The light sources within the light device may produce a light output.

A method may further include rotating a shaft coupled to a set of moveable members disposed within the modular optical unit. Responsive to rotating the shaft coupled to the set of moveable members, a process may further include extending or retracting the set of moveable members. Responsive to extending or retracting the set of moveable members, the method according to one or more embodiments may further include extending or retracting the set of optical assemblies in a linear direction away from or towards the set of light sources, whereby the set of optical assemblies are coupled to the set of moveable members. Further, the light output produced by the set of light sources disposed within the light device may be variable depending on the position of the optical assembly with respect to the set of light sources.

In yet another aspect, embodiments provided within the present description may include a method of assembly for a light device. Such a method for assembling a light device, according to one or more embodiments, may include providing a housing of the light device. The housing may further include a dedicated location adapted for a motor, whereby the light device may be configured to be coupled to a surface of a vehicle. Further, a method for assembling a light device may further include providing a set of modular optical units to be disposed within an interior of the housing of the light device. Each modular optical unit of the set of modular optical units may further include an optical assembly, a frame, and a shaft, whereby the shaft for each modular optical unit of the set of modular optical units may include a connecting end and a receiving end, the connecting end and the receiving end being located on opposite sides of the shaft.

A method may further include orienting each modular optical unit of the set of modular optical units in a desired orientation within the housing, which further includes the steps of positioning a first modular optical unit proximate a distal side of the housing, whereby the distal side of the housing is generally farthest from the dedicated location adapted for the motor, orienting the first modular optical unit such that an optical assembly of the first modular optical unit is oriented towards a front side of the housing, whereby the receiving end of a shaft disposed within the first modular optical unit is positioned closest to the distal side of the housing, and coupling a second modular optical unit to the first modular optical unit. A method for assembling a light device may further include positioning the second modular optical unit adjacent to the first modular optical unit, whereby an optical assembly of the second modular optical unit is oriented towards the front side of the housing, coupling a receiving end of a shaft disposed within the second modular optical unit with the connector end of the shaft disposed within the first optical unit, and repeating coupling additional modular optical units until a last modular optical unit is positioned within the housing as needed. Further, the last modular optical unit may be positioned such that a connecting end of a shaft disposed within the last modular optical unit may be pointing towards a side of the housing that is proximate to the dedicated location adapted for the motor, whereby the connecting end of the shaft of the last modular optical unit may be capable of being rotatably coupled to the motor.

Other aspects and advantages of the invention will be apparent from the following description and the appended claims.

DETAILED DESCRIPTION

Figure 1:
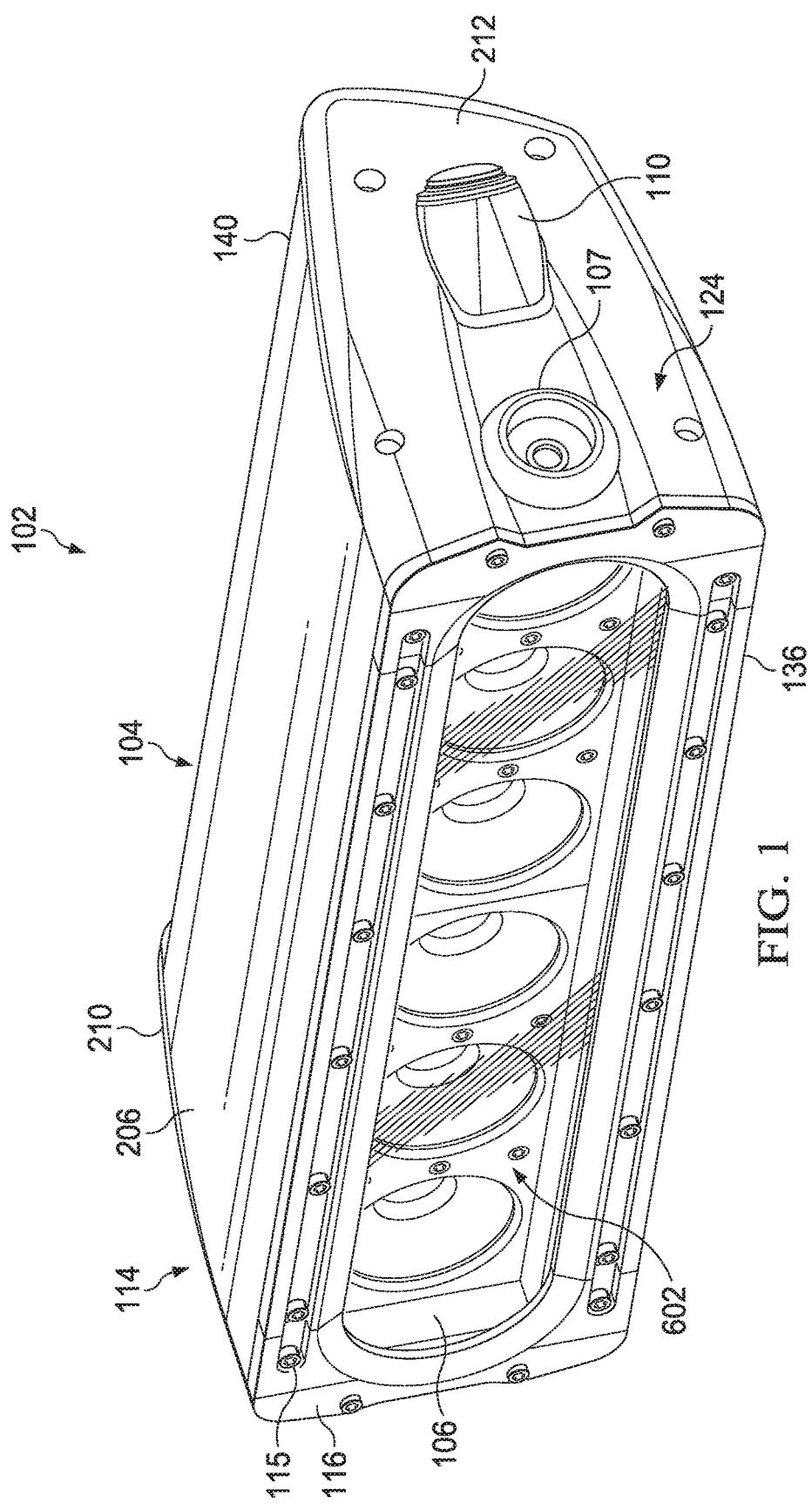
FIG. 1 is an illustration of a front perspective view of a light device adapted for use in a vehicle in accordance with an illustrative embodiment.

In the following detailed description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

Throughout the drawings, like reference characters are used to designate like elements. Further, the drawings are not to scale and depicted components or structures may have dimensions other than those depicted or perceived in the drawings.

As used herein, the term "coupled" or "coupling" may indicate a connection. The connection may be a direct or an indirection connection between one or more items. Further, the term "set" as used herein may denote one or more of any item.

In the following discussion and in the claims, the terms "including" and "comprising" are used in an open-ended fashion, and thus should be interpreted to mean "including, but not limited to . . . ."

As a preface to the detailed description, it should be noted that, as used in this specification, the singular forms "a", "an", and "the" include plural referents, unless the context clearly dictates otherwise.

The different illustrative embodiments recognize and take into account a number of different considerations. Proper illumination is a necessity for all vehicles when driven either at nighttime and/or in conditions with poor visibility, such as, for example, during rainstorms, fog, or icy weather. Further, many drivers, unhappy with the basic light sources included in a vehicle, may choose to supplement their vehicles with auxiliary vehicle lights that are attached to one or more surfaces of a vehicle in order to provide additional or enhanced light and illumination for a vehicle.

It is noted that U.S. Pat. Nos. 9,423,090 and 9,423,092, which are assigned to the present assignee, describe one or more embodiments for a light device whereby the light produced from the light source within the light device may be adjustable over a range of angles so as to have an adjustable light spread. U.S. Pat. Nos. 9,423,090 and 9,423,092 are incorporated herein in their entirety.

One or more embodiments described in the present disclosure may relate to one or more light devices adapted to the environment of a vehicle, whereby the light output from the light device may be controlled so as to achieve a particular output, including a particular angle of light spread. More specifically, one or more embodiments described herein may provide for a light fixture whose angle of light spread, for example, may be adjusted to produce various sized floodlights or spotlights to suit the preferences or driving needs of a driver of a vehicle. The present description further includes additional details and information regarding an exemplary structural makeup, several internal components, and internal mechanisms of such light devices.

Beneficially, drivers may welcome a light device that is adapted for use with a vehicle that provides more than a single type of light output, because such a light device may effectively replace multiple light fixtures that are conventionally used to produce either a spotlight or a floodlight. The following description includes additional details regarding one or more components, mechanisms, and assembly units that may be used to provide an adjustable light output from a light device for use with a vehicle. Other properties of a light output emitted by the light device may also be adjustable using one or more functions as disclosed herein.

Turning to FIG. 1, FIG. 1 shows a frontal perspective view of an exemplary lighting device in accordance with one or more embodiments. Light device 102 may include one or more light sources (not shown in FIG. 1). Any suitable light source may be utilized to provide illumination and light in light device 102, including without limitation, light emitting diodes (LEDs)(such as light emitting diodes 604 shown in FIG. 6), lasers, light bulbs, compact fluorescent light (CFL) bulbs, incandescent light bulbs, halogen light bulbs, and/or fluorescent light bulbs. Light device 102 may also be referred to as an illumination apparatus.

Light device 102 provides a light output via one or more of the internal light sources as noted above. A light output, as used herein, may include numerous properties and/or characteristics of any light emitted by the light device 102. Such properties or characteristics of the light output produced by light device 102 may include the light spread of the light output. Light spread may refer to the distribution of the light beams produced by the light device. Light spread may interchangeably be referred to herein as the angle of light spread. The angle of light spread may be measured in degrees, and be used to indicate how narrow or broadly distributed the beams of light are when emitted from light device 102.

A spotlight may be a set of light beams that are narrowly distributed. Spotlights are more concentrated and narrowly focused, and illuminate a smaller area. Most spotlights range from at least five (5) degrees to forty-five (45) degrees, although this range is meant to be exemplary only and not limiting as to the beam angles of a spotlight in the present disclosure in any way. One or more light devices, such as light device 102, described in the present description may be adapted to produce a spotlight over such a range. Those of ordinary skill will appreciate that other ranges of light spreads may be provided by light device 102 to produce a spotlight other than the range listed above.

In contrast to a spotlight, a floodlight may be a set of light beams that are broadly distributed to cover a wider and more general area of illumination. Most floodlights range from at least forty-five (45) degrees to a hundred and twenty (120) degrees, although this range is meant to be exemplary only and not limiting as to the beam angles of a floodlight in the present disclosure in any way. One or more light devices, such as light device 102, described in the present description may be adapted to produce a floodlight over such a range. Those of ordinary skill will appreciate that other ranges of light spreads may be provided by light device 102 to produce a floodlight other than the range listed above.

In one or more embodiments, light device 102 may be configured to produce a spotlight or a floodlight by virtue of one or more components and a structural assembly of light device 102. Thus, the light spread produced by light device 102 may be adjustable and variable to suit the needs of the driver of a vehicle and/or other user in a vehicle who may need benefit from being able to select between a focused spotlight (i.e. narrow angle of light spread) and a flood light (i.e. wider area angle of light spread).

Other properties and characteristics of the light output produced by light device 102 may also be adjustable or alterable. For example purposes only, and without limitation as to properties and characteristics, the overall shape of the light output produced by light device may be variable in one or more embodiments, such as being altered from a circular to an elliptical shape. Further, the intensity of the light output produced by light device 102 may be increased or decreased (e.g. dimmed) in one or more embodiments.

Light device 102, as used herein, may be an enclosed module. Light device 102 may include an outer housing or structural container, such as housing 104. Housing 104 may be the structure that encases or encloses some or all of the internal components of light device 102. Any material may be used to form housing 104 as known in the art or as yet to be developed, including, but without limitation to, the use of plastics, metals, or a combination thereof. In one or more embodiments, housing 104 may be made in whole or partially, without limitation thereto, from aluminum. Further, housing 104 may be painted a solid, uniform color. For example purposes, and without limitation as to the color, in one or more embodiments light device 102 may be painted a solid black color so as to increase the aesthetic appeal of light device 102 and provide a uniform, polished appearance.

Housing 104 may generally be made to withstand exposure to environmental elements such as rain, wind, dust, snow, ice, because it is contemplated that light device 102 may be located, in one or more embodiments, on an exterior surface of a vehicle and subject to ambient conditions. Nevertheless, light device 102 may be mounted to any surface of a vehicle, including any surface located externally or internally within a vehicle.

Further, any vehicle known in the art may be fitted with a light device, such as light device 102. Some examples may include, without limitation, all types of motor vehicles, including water vehicles, snow vehicles, and/or off-road vehicles. In one or more embodiment, light device 102 may also be coupled to a stationary, non-mobile structure. One or more users may desire in such circumstances to use light device 102 to provide an adjustable light output even if light device 102 is not coupled to a surface of a vehicle.

Light device 102 may be permanently or removeably mounted to a surface of a vehicle. It is contemplated herein that light device 102 may be affixed to any surface of a vehicle. Accordingly, light device 102 may also be referred to as a light fixture in the present description.

Figure 15:
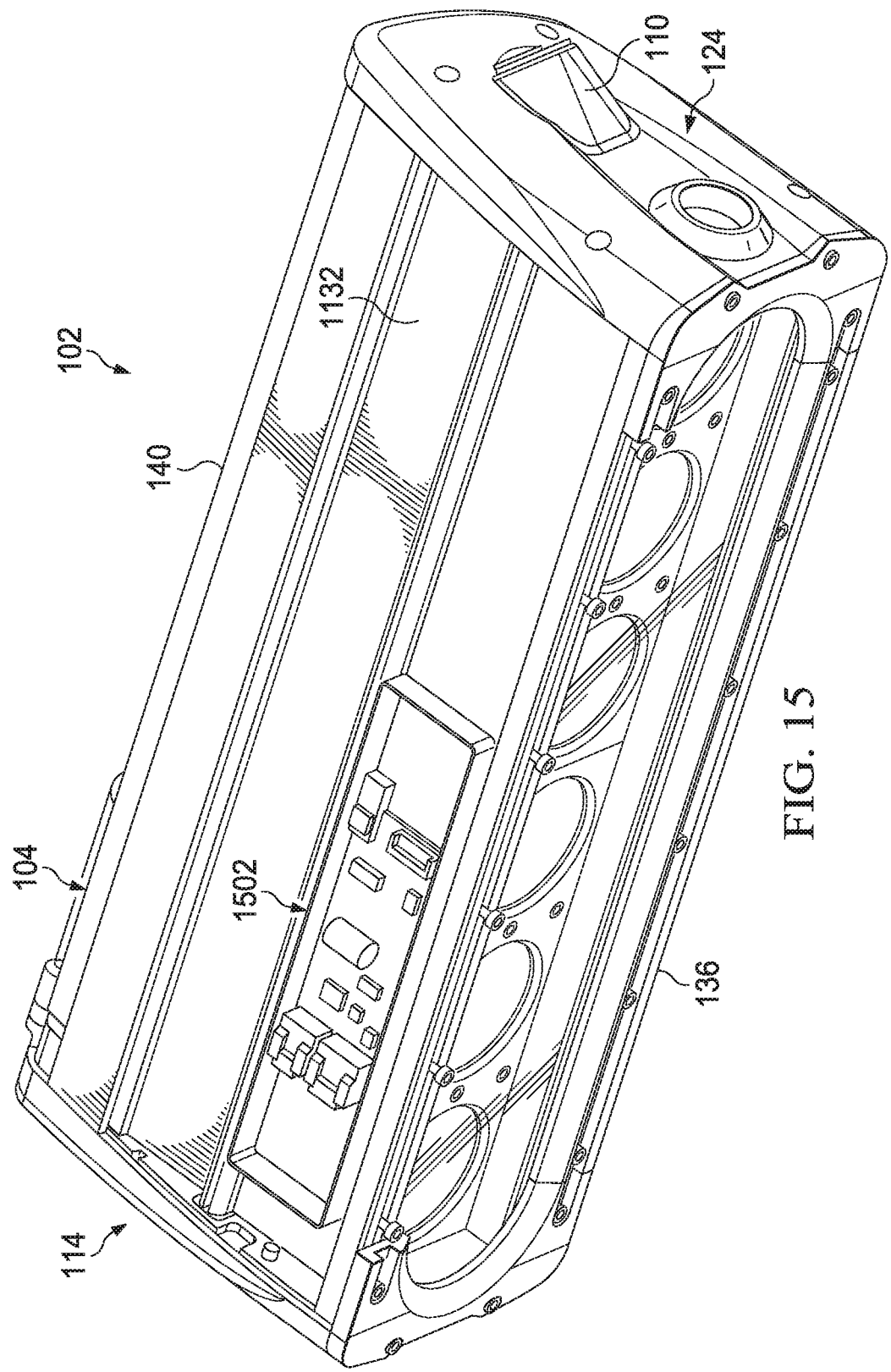
FIG. 15 is an illustration from a top view of a light device in accordance with an illustrative embodiment.

Housing 104 may have a front surface 136 and a rear surface 140, as shown in FIG. 1. In one or more embodiments, light device 102 may further include at least two end caps located on each lateral side of light device 102. End cap 114 and end cap 124 may be designated end caps adapted for installation on light device 102. An exemplary embodiment of end cap 124 may be seen in FIG. 1, FIG. 2, and FIG. 17. End cap 114 may be coupled to a side of housing 104 that is closest to motor housing 204 (e.g. in FIG. 2) according to one or more embodiments. An exemplary embodiment of end cap 114 is shown in FIG. 15. Each end cap 114, 124 may be a structural piece that is configured to cover and protect any exposed parts and components disposed on either end of light device 102. Further, end caps 114, 124 may provide a uniform, polished, aesthetically appealing appearance for light device 102.

Cable passage mount 110 may be located on a single end cap, (e.g. end cap 124 as shown in FIG. 1) in one or more embodiments. In one particular embodiment, at least one opening (e.g. cable opening 111 in FIG. 2) or hole may extend through cable passage mount 110, which may be used for connecting a cable or wire from a power source to an internal component of light device 102. Accordingly, in one or more embodiments, a wire or a cable may be coupled to a suitable connection point at one end of the wire or cable and may also be connected to a power source at the other end of the wire or cable. For example purposes only, and without limitation thereto, light device 102 may be coupled to a battery disposed within a vehicle via cable, and thereby, receive power from the vehicle battery when the vehicle is turned on.

Figure 2:
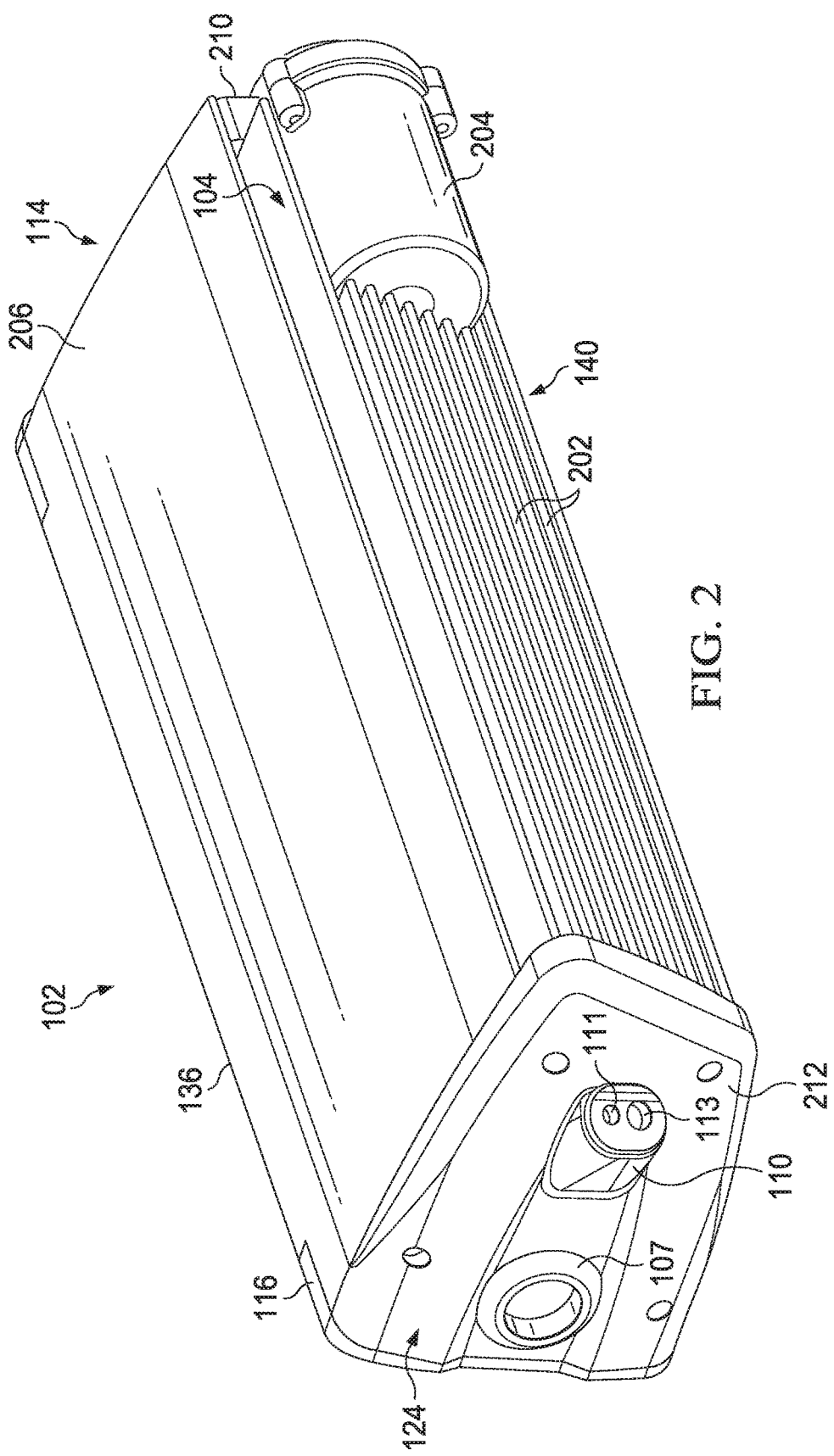
FIG. 2 is an illustration of a rear perspective view of the light device shown in FIG. 1 in accordance with an illustrative embodiment.

In another embodiment, another cable opening may extend through cable passage mount 110 for another wire or cable to be located (e.g. cable opening 113 in FIG. 2). Such a cable may be coupled to an associated separate controller (controller not shown in FIG. 1) that may be used to control one or more functions of light device 102. In such an exemplary embodiment, light device 102 may be controlled using a wired connection to an associated controller. Any wires and/or cables may be connected from light device 102 to either a separate controller, power source, or other suitable component using any coupling techniques known in the art or as yet to be developed.

Alternatively, light device 102 may be coupled to an associated controller wirelessly such that the associated controller may be adapted to send and receive data signals wirelessly. One or more wireless transceivers, transmitters, or receiver devices may be placed or integrated within either light device 102 and/or an associated controller, including, without limitation, a Bluetooth® device, an infrared device, or a wireless local area network device, such as a Wi-Fi device.

As shown in FIG. 1, in one or more embodiments, a designated mounting spot may be provided on each end cap 114 and 124 of light device 102 for connecting a mounting bracket (not shown) to light device 102. FIGS. 1 and 2 show mount opening 107. In one or more embodiments, a mounting bracket (not shown) may be used to attach and/or affix light device 102 to any surface of a vehicle. In one or more embodiments, one or more fasteners may be disposed on a mounting bracket and disposed through mount opening 107 so as to attach or affix one side of such a mounting bracket to either end of light device 102. Any suitable mounting bracket known in the art may be used. Alternatively, light device 102 may be attached using any attachment techniques or affixation methods known in the art, including, without limitation, one or more fasteners, suction cups, adhesives, welding, or any other means for attachment known in to those of ordinary skill in the art. As shown in FIG. 17 and discussed later herein, the other side of a mounting bracket may be coupled to mount hold 1730 using mount hold opening 1606 shown in FIG. 16.

Light device 102 may include lens 106 which may cover and protect one or more internal components. Lens 106 may be made of any suitable material. In one or more embodiments, lens 106 may be made of a polycarbonate lens material it, is intended that lens 106 is made of a clear, transparent material so that any light beams emitted from one or more light sources located within light device 102 are able to shine through lens 106. Lens 106 may be sized to fit within one or more designated locations of housing 104 (e.g. lens channel 1112 shown in FIG. 11). Lens 106 may fully cover each modular optical assembly, such as modular optical assembly 602, which is discussed with respect to FIG. 6, later in the present description.

In addition, a cosmetic cover, such cover 116, may be included with light device 102. Cover plate 116 may be a protective cover coupled to the front surface 136 of housing 104. Cover plate 116 may be coupled to housing 104 and disposed in front of lens 106 (or may also be coupled to a portion of lens 106 in one or more embodiments). In one or more embodiments, an additional outer cover plate (not shown in FIG. 1) may be disposed over cover plate 116 and affixed via one or more fasteners through the set of fastener holes 115 shown in FIG. 1.

Figure 5:
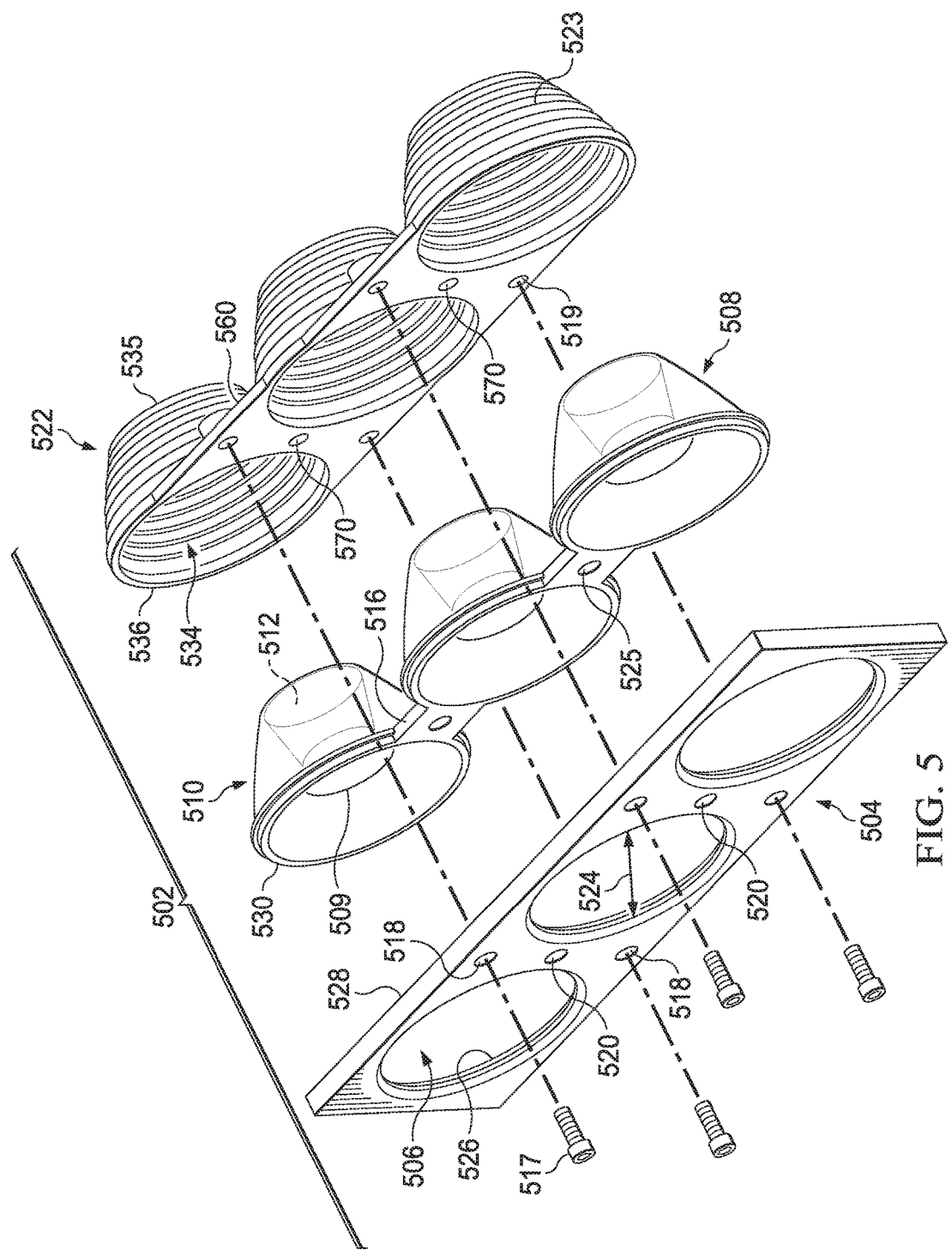
FIG. 5 is an illustration from a perspective view of an optical assembly for use in a light device in accordance with an illustrative embodiment.

A set of modular optical assembly units, such as modular optical unit 602 shown in FIG. 6 and discussed later in the present description, may be located within light device 102, and may be located behind lens 106. As previously discussed, a "set" may include one or more as used throughout the present description. In one or more embodiments, the set of modular optical units 602 may be used to produce either a spotlight or a floodlight effect. In one or more embodiments, the set of modular optical units 602 may be moved linearly either towards or away from a set of light sources also disposed within light device 102. A set of optical assemblies will be discussed in more detail below (e.g. optical assembly 502 as shown in FIG. 5 and as discussed with respect to FIG. 5 below).

Turning to FIG. 2, FIG. 2 shows a rear perspective view of the light device shown in FIG. 1 in accordance with one or more embodiments. As shown in Figure end cap 124 may be located on either side of light device 102 in one or more embodiments. FIG. 2 further illustrates mount hold opening 107 a. As previously discussed, in one or more embodiments, one side of a mounting brackets as known in the art may be used to affix light device 102 to a surface of a vehicle by connecting such a bracket through mount hold opening 107.

As shown in FIG. 2, in one or more embodiments, light device 102 may include a set of fins, such as set of fins 202. Set of fins 202 may be oriented in any desired orientation, including either horizontally or vertically oriented. As shown in FIG. 2, set of fins 202 are horizontally oriented. Each fin of set of fins 202 is spaced a distance apart from the subsequent fin.

Figure 4:
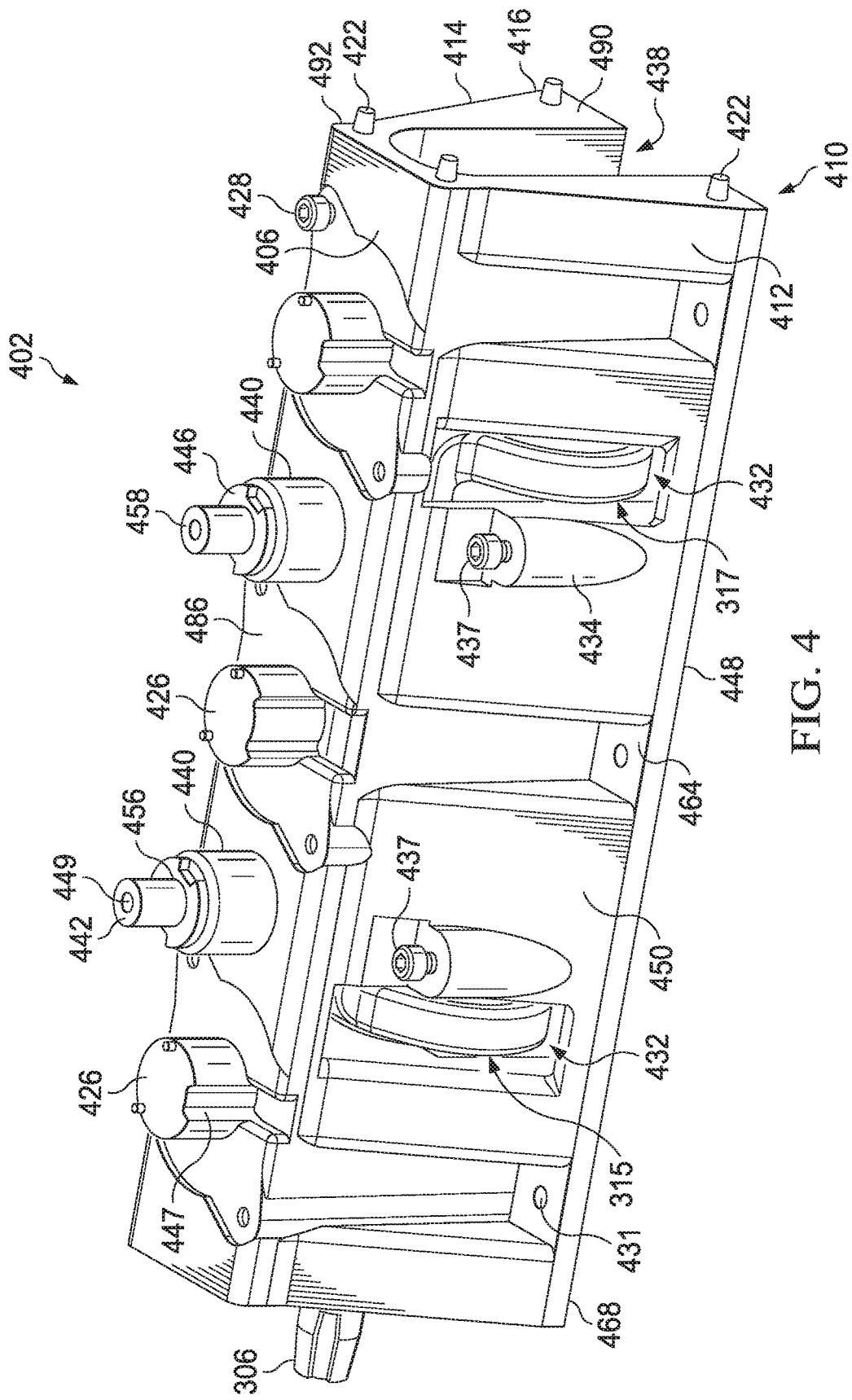
FIG. 4 is an illustration from perspective top side view of a frame for use in a light device in accordance with an illustrative embodiment.

Set of fins 202 may be adapted to dissipate heat emitted from light device 102. As further explained below, light device 102 may include a number of light sources, as well as other electromechanical components that may produce a great amount of heat. The output of heat may cause one or more negative effects to light device 102. Accordingly, set of fins 202, along with other elements of light device 202 (e.g. frame 402 as shown in FIG. 4), may aid in dissipating any such heat away from light device 102 so as to prevent light device 102 from overheating.

Set of fins 202 may extend along a back surface of light device 102 from one side of light device 102 towards the opposing side of light device. It is noted that set of fins 202 may be integrally formed with the outer housing 104 of light device in one or more embodiments. Alternatively, set of fins 202 may be separately disposed on another structural piece that may be coupled to a rear surface of light device 102. Those of ordinary skill in the art will appreciate other arrangements and designs may be used for set of fins 202 that that shown in FIG. 2.

In one or more embodiments, the set of fins 202 may only partially extend along the back surface of light device 102. As shown in FIG. 2, light device 102 may include a motor housing, such as motor housing 204 disposed on the rear surface 140 of light device. Motor housing 204 may be coupled to a portion of the rear surface 140 of light device 102, and may be fitted over a designated motor mount surface (not shown) that forms a part of housing 102. The motor mount surface may be a designated area formed on the back wall (e.g. back wall 1122 shown in FIG. 11) of housing 104 and adjoining a set of fins 202. Such a motor mount surface may be formed out of an exterior of a rear surface of housing 104 in one or more embodiments. As shown in FIG. 2, set of fins 202 terminate at a point where motor housing 204 is coupled to the exterior rear surface of housing 104. In one or more embodiments, the motor mount surface beneath motor housing 204 may be a recessed interior portion that is sized to suit a desired motor. Motor housing 204 may be disposed over or located over the motor mount surface once a motor has been coupled to or fitted within the motor mount surface in one or more embodiments. Motor housing 204 may be configured to cover and protect one or more motors (motor not shown) located beneath motor housing 204.

In one or more embodiments, one or more motors may be used to operate one or more components located on light device 102 in order to alter one or more properties of the light output produced by light device 102. Any suitable motor known in the art may be used and located beneath motor housing 204, including, without limitation, any electric motor known in the art.

It is noted that in alternative configurations, set of fins 202 may extend along the entirety of a back surface of outer housing 104 of light device 102, and motor housing 204 (as well as an internal motor(s)) may be disposed elsewhere on light device 102.

Further, in one or more embodiments, light device 102 may include a top cover, such as top cover 206 shown in FIG. 2. Top cover 206 may serve as a protective cover over a top surface of outer housing 104 of light device 102, and will be discussed further with respect to FIG. 11, FIG. 14, and FIG. 15 in the present description.

As those of ordinary skill in the art, alternative configurations may be envisioned for the structure of light device 102. The shape and size of light device 102 as shown in FIGS. 1 and 2 is meant to be exemplary only and is non-limiting. Light device 102 may be of any shape and/or size as desired. It is noted that light device 102 (including any internal components) may be made of any suitable materials, including, without limitation, any type of plastic, metal, glass, or combination thereof, and any material known in the art or as yet to be developed.

Figure 3:
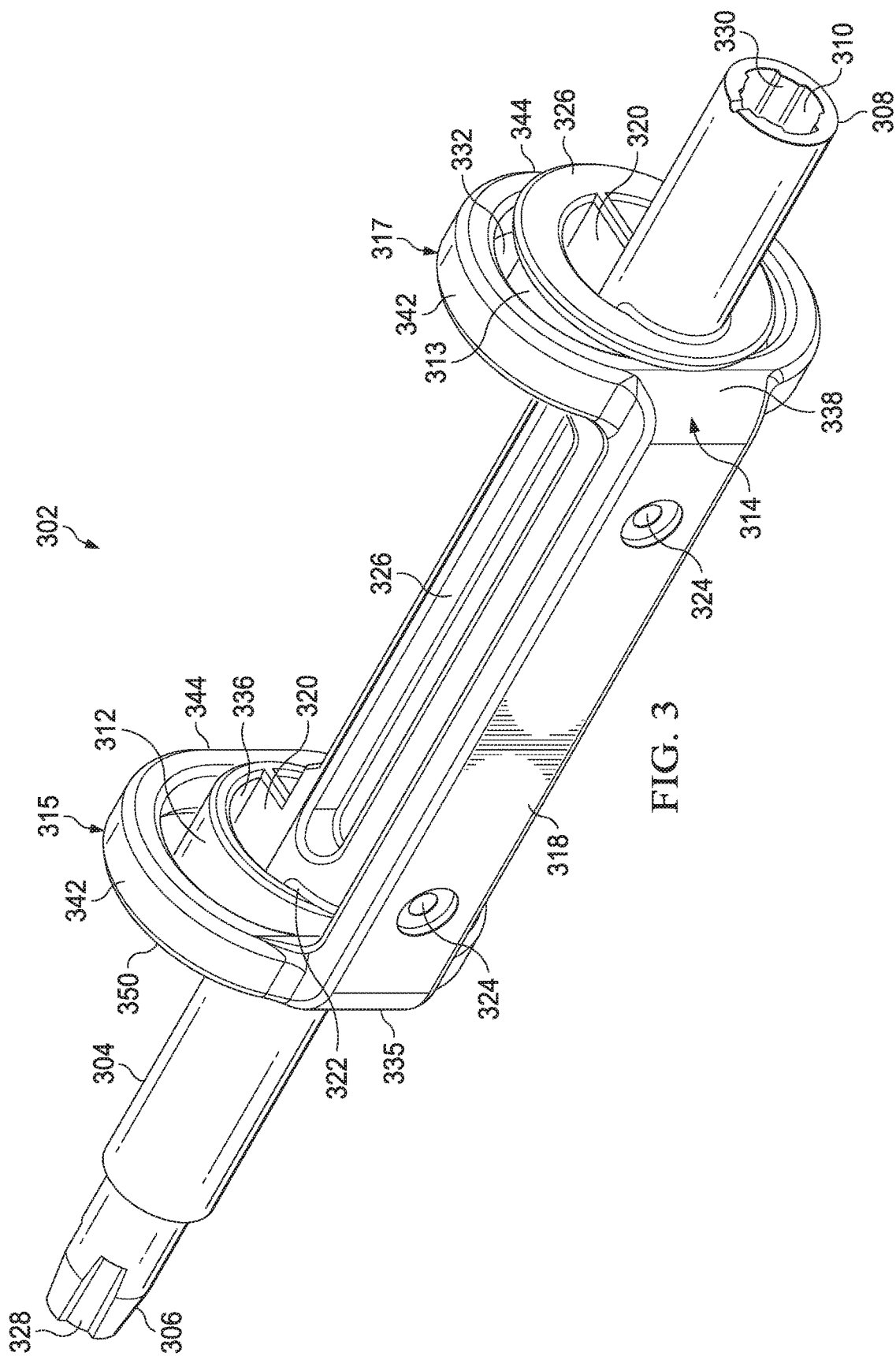
FIG. 3 is an illustration of a yoke assembly for use in a light device in accordance with an illustrative embodiment.

Turning to FIG. 3, FIG. 3 shows a pictorial illustration of a yoke assembly in accordance with one or more illustrative embodiments provided herein. In one or more embodiments, a yoke assembly, such as yoke assembly 302 is included in a light device, such as light device 102. In one or more embodiments, yoke assembly 302 may include a yoke, such as yoke 314, which includes a pair of yoke lobes, such as yoke lobes 315 and 317. Yoke assembly 302 may further include a shaft, such as shaft 304, and a set of cams, such as cams 312 and 313.

As further described below, yoke 314 may be used to contain shaft 304 and cams 312, 313. In one or more embodiments, yoke 314 includes yoke lobes 315 and 317 and a connecting bar 318 that connects the yoke lobes 315 and 317. Each individual lobe 315 and 317 may each have a cavity 332 (i.e. a hollow center portion) that is generally centrally located within each lobe 315 and 317.

In one or more embodiments, yoke lobes 315 and 317 may be shaped in a generally oblong shape or oval shape. Notably, yoke lobes 315 and 317 may have two sides that are longer (e.g. longer side 344) than the included two opposing shorter sides (e.g. shorter side 342) that define the hollow center 332 of the yoke lobes. In one or more embodiments, the longer sides are parallel to each other and the opposing shorter sides of each lobe are also parallel to each other, while the opposing shorter sides curve and the longer sides are straight. As shown in FIG. 3, the shorter sides form the top and bottom surfaces of each of yoke lobes 315 and 317.

It is noted that it may be useful to have an oblong shape for yoke lobes 315 and 317 in order to eliminate or reduce a possibility of vertical movement of yoke 314. As further explained below, in one or more embodiments, it may be desirable that yoke 314 be configured to move linearly along a horizontal axis, i.e. forwards and backwards, but not in an upwards or downwards direction. As cams 312 and 313 rotate around an inner perimeter 350 of each yoke lobe 315 and 317, the oblong shape of each yoke lobe may act to prevent yoke 314 from moving in a vertically upward or downward direction, thus ensuring that yoke 314 solely moves linearly in a forward or backwards direction when such movement is initiated.

Yoke lobes 315 and 317 may protrude from connecting bar 318 in a rear facing direction. Further, yoke lobes 315 and 317 may be perpendicularly disposed with respect to connecting bar 318. Each end 335,338 of connecting bar 318 may be coupled to and join with each yoke lobe 315, 317. Further, each end 335, 338 of connecting bar 318 may be coupled generally at central location (midsection) of a longer side (e.g. longer side 344) of each of the set of yoke lobes 316. In one or more embodiments, yoke 314, connecting bar 318, and yoke lobes 315 and 317 may all be integrally formed and manufactured as one piece. Alternatively, each piece or individual pieces thereof may be separately formed and then attached to each other.

Figure 12:
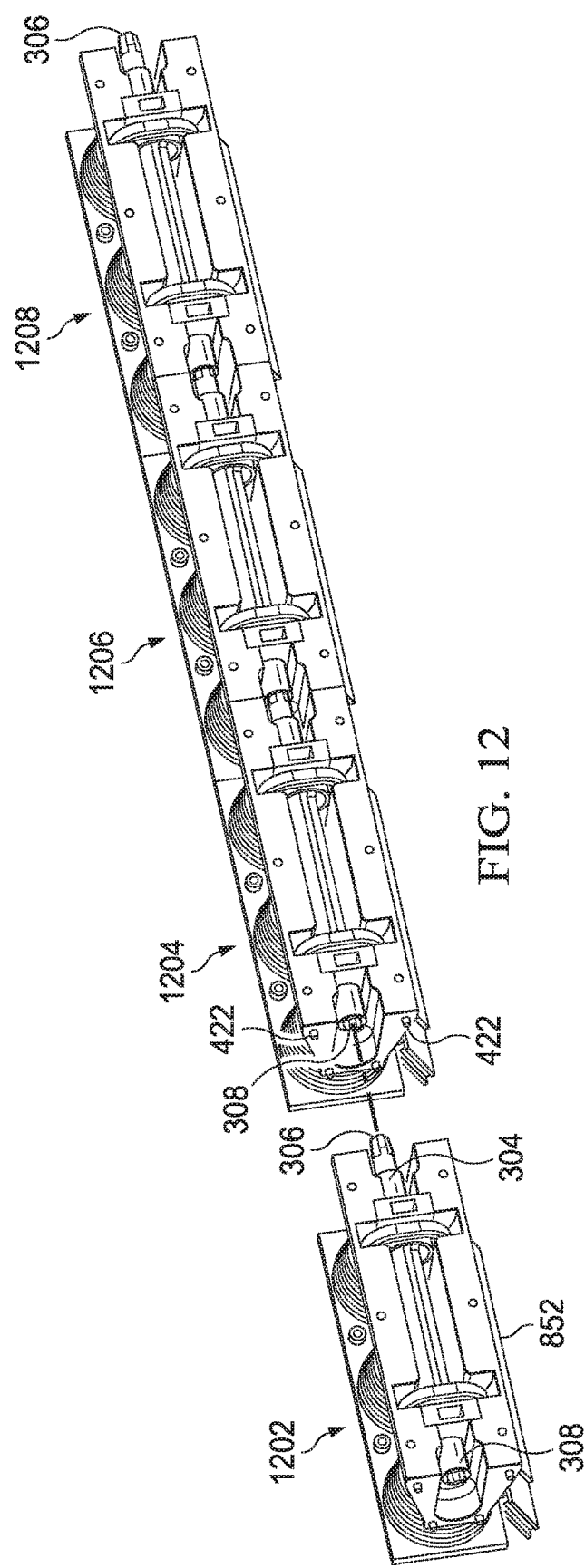
FIG. 12 is an illustration from a rear perspective view of multiple modular optical units connected to each other in accordance with an illustrative embodiment.
Figure 13:
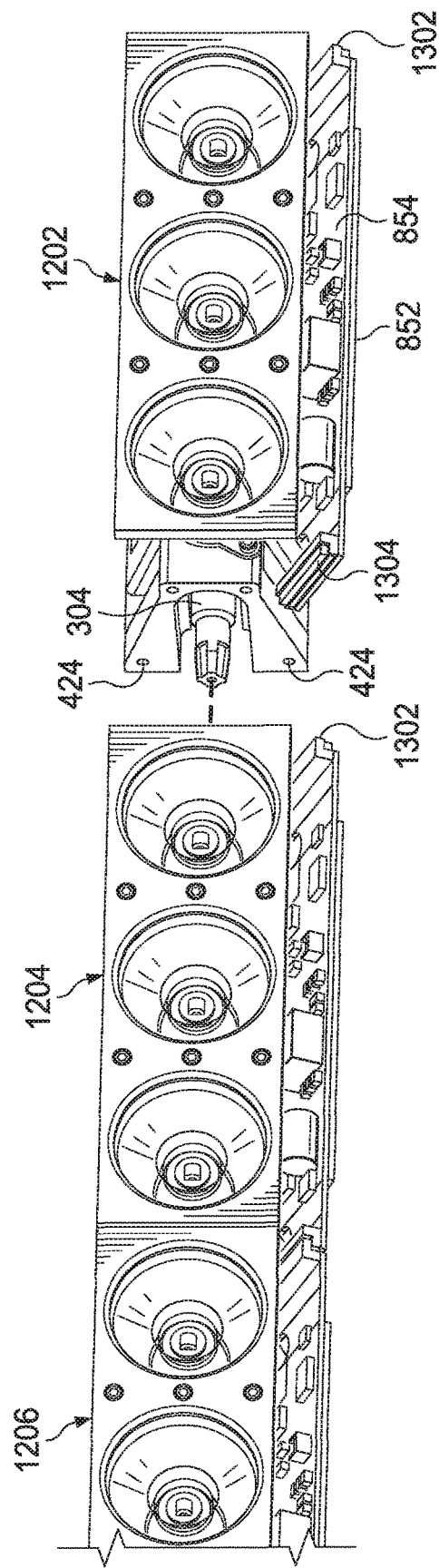
FIG. 13 is an illustration from a frontal perspective view of multiple modular optical units connected to each other in accordance with an illustrative embodiment.

Shaft 304 may be an elongated tubular having a generally cylindrical or rounded shape. In one or more embodiments, shaft 304 may include two ends disposed on opposite ends of shaft 304, whereby the two ends may be a connector end, such as connector end 306, and a receiving end, such as receiving end 308. In one or more embodiments, shaft 304 is configured to include a connector end and a receiving end, such that the connector end 306 may be matingly coupled (e.g. coupled together using "male" and "female" designated pieces) to another shaft at a corresponding receiving end 308 of the other shaft, as will be described further and as shown in FIGS. 12 and 13. In addition, as will be further described below in more detail and as shown in FIG. 17, a shaft connector end, such as connector end 306 may also function to couple to one or more gears in a gear train mechanism (e.g. gear train mechanism 1724 in FIG. 17) and a motor secured to a housing of a light device (e.g. at motor housing 204 in FIG. 2). Accordingly, when the motor is energized, rotational motion may be imparted through the gear train (e.g. gear train 1724 in FIG. 17) to a shaft, such as shaft 304.

In one or more embodiments, connector end 306 may include a protruding portion coupled to an end of shaft 304. Receiving end 308 may have a profile that is suitable for mating with connector end 306. As shown in FIG. 3, receiving end 308 of shaft 304 may include a hollow channel 310 so that a connector end, such as connector end 306 of shaft 304, may be inserted into receiving end 308 and held securely therein. Hollow channel 310 may extend partially or completely through shaft 304 according to one or more embodiments. Additionally, connector end 306 may taper away from shaft 304 and may include a groove 328 that is used to fit in a corresponding slot 330 in the receiving end, such as receiving end 308 of shaft 304, when two shafts 304 are connected to one another. Those of ordinary skill in the art will appreciated that the structure and design of shaft 304, connector end 306, and receiving end 308 are exemplary and non-limiting. Other configurations and design as known to one skilled in the art are contemplated as well.

Groove 326 may be a result of a manufacturing process for manufacturing shaft 304 and may be useful in facilitating such as manufacturing process, but it is noted, that in other embodiments of shaft 304 may not require or need groove 326. Furthermore, other manufacturing processes may be utilized whereby groove 326 is not included in shaft 304.

In addition to a shaft, such as shaft 304, yoke assembly 302 may further include cams 312 and 313. Cams 312 and 313, as shown in FIG. 3, may be pieces used to transform the rotary motion of the shaft into linear motion of the coupled yoke 314. Cams 312 and 313 may be attached to shaft 304. Accordingly, as used herein, the term "camshaft" may be used interchangeably with shaft 304. In one or more embodiments, cams 312 and 313 may be integrally formed with shaft 304. Alternatively, cams 312 and 313 may be attached to shaft 304 using any attachment methods known in the art or as yet to be developed. Cams 312 and 313 may be configured to rotate simultaneously with the rotation of shaft 304. Cams 312 and 313 may be cylindrically shaped, although other shapes and designs are contemplated.

As shown in FIG. 3, a lip, such as lip 326 may be coupled to a cam, whereby the cam is located at a distal end of shaft 304, such as a cam 313. Lip 326 may be a piece that assists to prevent cam 313 from sliding out of yoke 314. As shown in FIG. 3, lip 326 may be a circular piece that is coupled to an outer face of cam 313. Lip 326 may have a diameter that is as at least equal to or greater than a diameter of at least one of the yoke lobes (e.g. yoke lobe 317) so as to prevent cam 313 from slipping through the cavity 332 and out of place.

As shown in FIG. 3, each cam 312,313 is perpendicularly aligned with the longitudinal axis of shaft 304 in order to enable cams 312,313 to rotate with shaft 304 about the same axis. Further, a connecting element 320, which as shown in FIG. 3 is a piece that is generally rectangular shaped, may connect a distal inner surface 336 of cam 312 and 313 to an edge of shaft 304. Accordingly, shaft 304 is not positioned within a center of cavity or opening of each cam 312, 313, but rather positioned off-center and coupled to an inner back edge 322 of each cam. This non-limiting, exemplary arrangement may allow each cam 312, 313 to rotate simultaneously with shaft 304 when shaft 304 is rotated and in a same direction (e.g. either forward or reverse). In one or more embodiments, shaft 304 may be rotated in either a clockwise or counterclockwise direction or both.

To position shaft 304 and the integrated cams 312, 313 within yoke 314, the shaft 304 may be inserted through the cavity 332 located within each yoke lobe 315, 317. After being inserted, each cam 312, 313 is positioned so as to rest within each corresponding yoke lobe 315,317. In other words, one or more outer surfaces of cam 312 rests against and touches an inner surface of yoke lobe 315, and one or more outer surfaces of cam 313 rests against (when not in motion) and touches an inner surface of yoke lobe 317.

When yoke assembly 302 is assembled, in one or more non-limiting embodiments, yoke lobes 315, 317 may protrude backwardly behind the connecting bar 318 of yoke 314. Further, when assembled, each cam 312, 313 may be disposed within each corresponding yoke lobe 315, 317, and shaft 304 may be effectively contained within each of the yoke lobes as well. A diameter of shaft 304 may be smaller than a diameter of each lobe 315, 317 so as to fit within lobe 315, 317.

In an embodiment whereby cams 312, 313 include at least one lip, such as lip 326, an inner surface of lip 326 may either somewhat protrude out over or is at least in alignment with an outer face of an adjacent yoke lobe (e.g. yoke lobe 317). In other embodiments, each cam 312, 313 may include a lip such as lip 326.

Each of the set of yoke lobes 315, 317 has two longer sides (e.g. longer side 344). As shown in FIG. 3, each yoke lobe 315, 317 may be proportionally longer than the cams 312, 313. Consequently, each cam 312, 313 of the set of cams 328 are capable of completing a full rotation around an inner perimeter 350 of each of the yoke lobes (e.g. yoke lobes 315 and 317) of the yoke lobes 315,317. As discussed further below, when shaft 304 begins to rotate, cams 312,313 also begin to rotate simultaneously. Accordingly, a full rotation of shaft 304 in either a clockwise or counterclockwise direction is an indication that cams 312,313 have also completed a full rotation and returned to their original, starting position.

As shown in FIG. 3, a pair of fastener holes 324 are disposed in the connecting bar 318 of yoke 314. In one or more embodiments, a set of moveable members (e.g. moveable members 442 and 458 in FIG. 4) may be coupled to yoke 314 by fastening one end of the set of moveable members to connecting bar 318 of yoke 314 using any fasteners known in the art. It is noted that any alternative means of attaching the set of moveable members to the yoke 314 may also be used, including, without limitation, soldering, welding, adhesives or any other attachment mechanism known in the art or as yet to be developed.

Turning to FIG. 4, FIG. 4 shows a perspective top side view of a frame that may be used in accordance with one or more embodiments described herein. In one or more embodiments, frame 402 may function as a structural assembly to which one or more components may be fastened or attached. Further, frame 402 may serve as a heat sink, which is discussed below in further detail.

In one or more embodiments, frame 402 may include a front planar surface 406 that extends between and joins a pair of sidewalls 410. When looking towards the front surface of the front planar surface 406, in one or more embodiments, a set of mounting surfaces 426 and a set of moveable member channels 440 may be visible.

In one or more embodiments, set of mounting surfaces 426 may be raised set of pedestals, as shown in FIG. 4. In one or more embodiments, the set of mounting surfaces 426 may be adapted to support one or more light sources used to provide a light output. In one or more embodiments, the set of light sources may be a set of light emitting diodes such as set of light emitting diodes (LEDs) 604 shown in FIG. 6. Thus, set of mounting surfaces 426 may receive and support a set of LEDs, such as set of LEDs 604, which may be placed on a top surface of the set of mounting surfaces 426 (e.g. set of raised pedestals). The set of mounting surfaces 426, while shown as a raised set of pedestals, may in alternative configurations, not be raised but rather be level with a front side surface of front planar surface 406.

Figure 6:
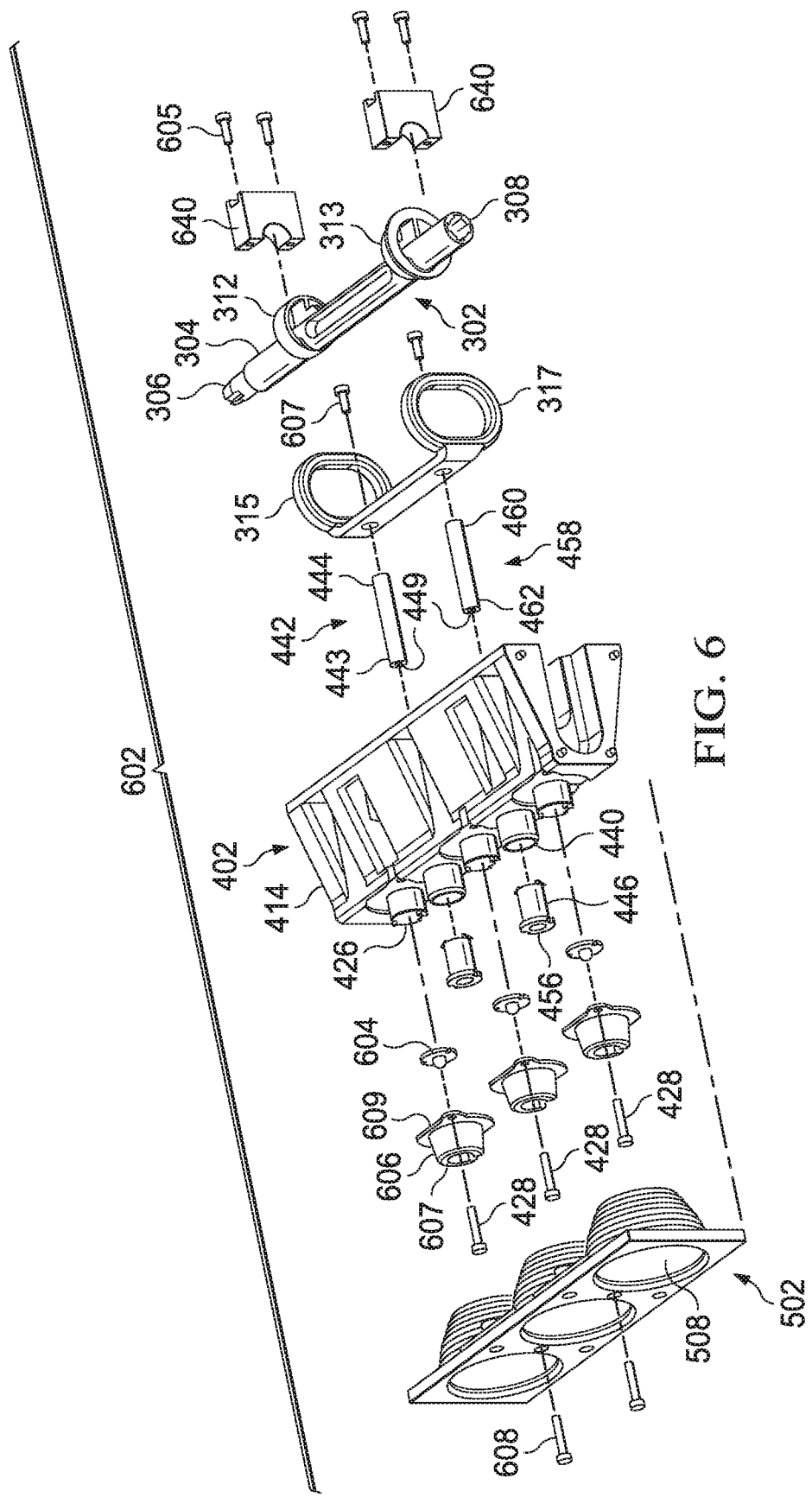
FIG. 6 is an illustration from an exploded perspective view of several components of a modular optical unit for use in a light device in accordance with an illustrative embodiment.
Figure 7:
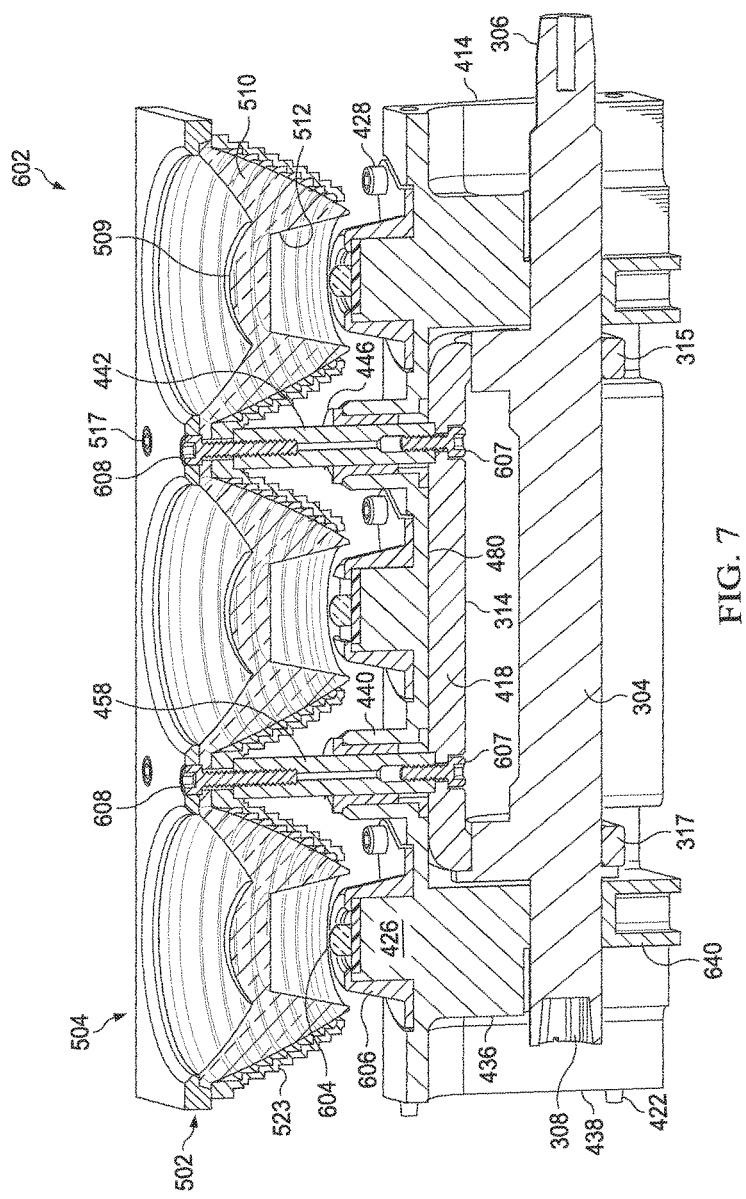
FIG. 7 is an illustration having a partially cross-sectional view of the modular optical assembly unit shown in FIG. 6 in accordance with an illustrative embodiment.

To secure the set of light emitting diodes 604 against a set of mounting surfaces 426, in one or more embodiments, a set of LED caps, such as set of LED caps 606 (as shown in FIG. 6 and FIG. 7) may be used to secure LEDs 604 to the set of mounting surfaces 426.

As shown in FIG. 4, a front side of front planar surface 406 may further include cap surfaces 486 which are designated surfaces or areas formed to accommodate a shape and size of LED caps 606 shown in FIG. 6 and FIG. 7. Further, one or more LED cap screws, such as LED cap screw 428 shown in FIG. 4 and FIG. 6 may be used to fasten LED caps 606 to a front side of front planar surface 406 of frame 402.

As shown in FIG. 6, each LED cap 606 may have an opening at a front surface 607 and a rear surface 609 of LED cap 606. Because of the opening located in the rear surface 609 of each LED cap 606, each LED cap 606 fits over each mounting surface 426 and may be secured to frame 402 (e.g. via LED cap screw 428). Further, LED cap 606 fits over each light emitting diode 604 and also does not obstruct light emitted by each light emitting diode 604 because of the openings located through a front surface 607 and rear surface 609 of each LED cap 606 (as shown in FIG. 6).

Figure 8:
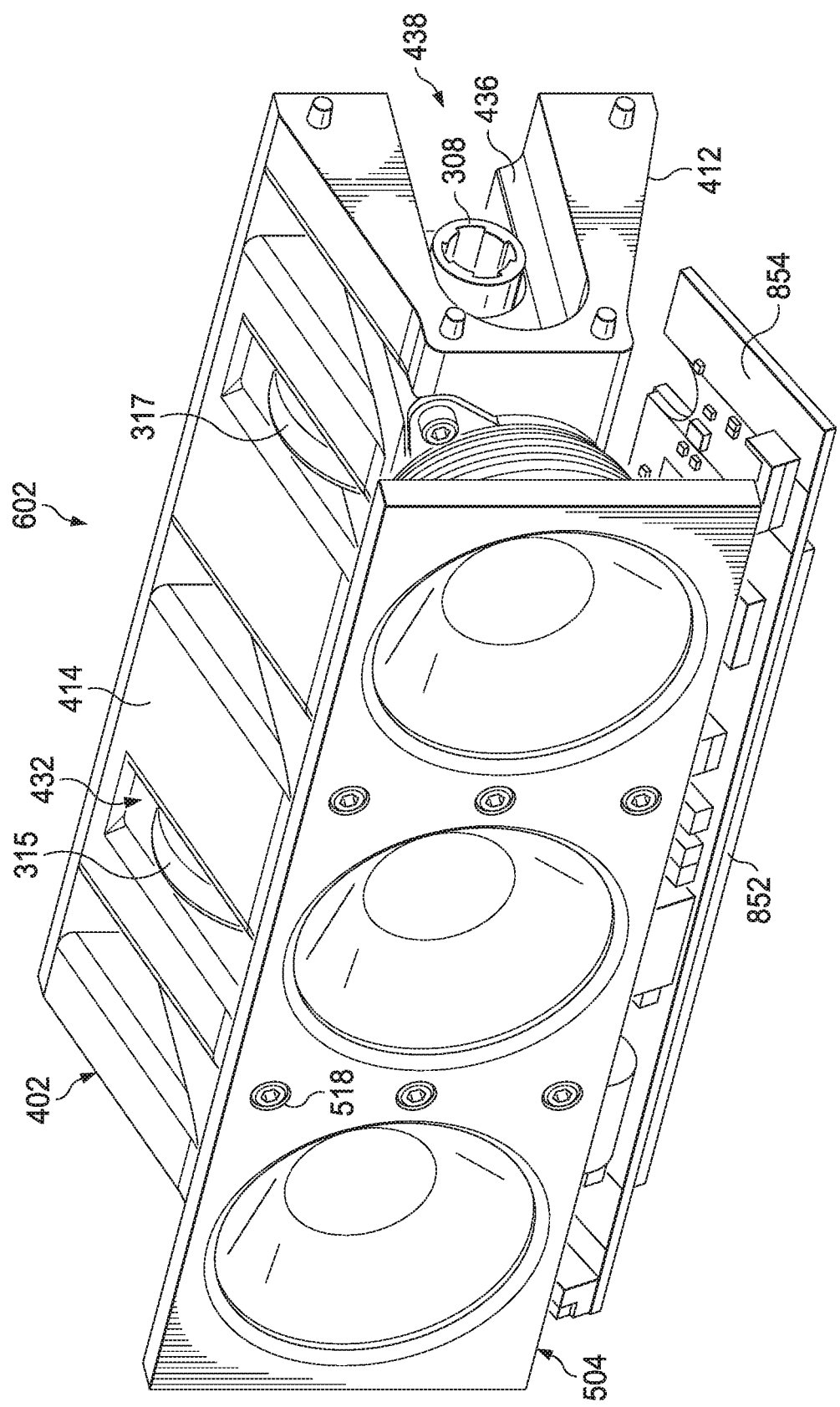
FIG. 8 is an illustration from a side perspective view of a modular optical unit in accordance with an illustrative embodiment.

Further, in one or more embodiments, each mounting surface of the set of mounting surfaces 426 may include a slot, such as slot 447. Slot 447 may provide a passageway for one or more wires to pass through, whereby such wires may be used to connect a light emitting diode (whereby the light emitting diode is held against or secured to a mounting surface 426) to an associated LED driver. One or more LED drivers (such as LED driver 854 shown in FIG. 8 is discussed in greater detail below.

In one or more embodiments, a set of moveable member channels 440 may also be disposed on the front planar surface 406 of frame 402. Set of moveable member channels 440 (as shown in FIG. 4) may extend from a front side of the front planar surface 406 to a rear of frame 402 and through a recessed interior portion 436 disposed on an underside 480 of frame 402 (as shown more clearly in FIG. 8).

Set of moveable member channels 440 are a set of cylindrically shaped (although other shapes may be suitable) elements formed in a body of frame 402 that have one or more bores extending through each moveable member channel. Moveable members 442 and 458 (shown in FIG. 6) are adapted to pass or slide through each channel of the set of moveable member channels 440. In one or more embodiments, slide rails may be used as a set of moveable members 442 and 458. Slide rails, as known in the art, are tubular elements that are generally cylindrical in shape, and may be configured to slide. Slide rails (e.g. moveable members 442 and 458) include two opposing ends and a bore (e.g. bore 449 shown in FIG. 4 and FIG. 6) within each moveable member. FIG. 6 provides a better view of moveable member 442 with its two opposing ends 443 and 444. Further, FIG. 6 provides a view of moveable member 458 with its two opposing ends 462 and 460. In FIG. 4, it is possible to view one end (e.g. end 443) of moveable member 442 and end 462 of moveable member 458.

In addition to the above, a bushing, such as bushing 446, may be disposed within each channel of the set of moveable member channels 440. Each bushing 446 may have a bore 456 through which each moveable member 442 may more easily be configured to slide through in a forwards or backwards direction. Each bushing 446 may be securely disposed in its respective movable member channel 440. In one or more embodiments, bushing 446 may be press fit into each channel 440.

As stated above, a non-limiting, exemplary embodiment of frame 402 may include the pair of sidewalls 410 (e.g. first sidewall 412 and second sidewall 414). The pair of sidewalk 410 may angle or flare outwardly in one or more embodiments so that a bottom edge 490 of a sidewall (e.g. second sidewall 414) flares outwardly with respect to a top edge 492 of the sidewall.

In one or more embodiments, there may be a recessed interior portion 436 (as shown in FIG. 7) disposed on an underside, such as underside 480, of frame 402. The recessed interior portion 436 may define a hollow cavity 438. The recessed interior portion 436 and hollow cavity 438 of frame 402 may more clearly be seen in FIGS. 7-10. The recessed interior portion 436 may be a structural block have a body with a thickness that descends from beneath the underside 480 of the front planar surface 406 and also extends between the pair of sidewalls 410. The recessed interior portion 436 may be recessed on both sides of frame 402 such that a portion of front planar surface 406 and a portion of the pair of sidewalls 410 may essentially overhang or extend beyond the edges of the recessed interior portion 436. As shown in FIG. 7, the front planar surface 406 may form a flange or overhang portion that is also connected to each sidewall (e.g. first sidewall 412 and second sidewall 414).

In one or more embodiments, frame 402 may also include a set of raised surfaces 450 disposed on an outer surface of one of the sidewalls, such as first side wall 412. The set of raised surfaces 450 may be spaced apart. Further, the set of raised surfaces 450 may flare outwardly and taper at an angle outwardly such that a base of the set of raised surfaces 450 may be angled away from a top edge of the raised surface.

Further, the set of raised surfaces 450 may include an aperture 432 in each of the set of raised surfaces 450. An aperture, such as aperture 432 may be formed through both the raised surface 450 and the first sidewall 412. In addition, an additional aperture 432 may be formed through second sidewall 414. While frame 402, as shown in FIG. 2, includes apertures 432 extending through first sidewall 412 and second sidewall 414, other designs and additional apertures may be utilized as those of ordinary skill in the art will appreciate. The apertures 432 may be described as "windows" or a hollow space that extends through sidewalls 412, 414. As shown in FIG. 4, the apertures 432 are generally rectangular shaped, although other shapes may be contemplated.

In one or more embodiments, a portion of yoke lobes 315 and 317 (as shown in FIG. 4) may protrude through apertures 432 when yoke assembly 304 is coupled to frame 402. A yoke assembly, such as yoke assembly 302 may be located within and coupled to an underside (e.g. 380) of frame 402. When coupled to the underside 480 of frame 402, a portion of yoke lobes 315 and 317 (as shown in FIG. 4) may protrude through the set of apertures 432 that extend through the set of raised surfaces 450 and through each of the sidewalls 412 and 414.

In addition to the above, frame 402 may include a first base 468 and a second base 416. First base 468 may be coupled to first sidewall 412, while second base 416 may be coupled to second sidewall 414. In one or more embodiments, each base is generally rectangularly shaped and has a top side 464 and a bottom side 448. Those of ordinary skill in the art will appreciate other shapes and formations of first base 468 and second base 416 may be used as well.

Fastener holes 431 may be disposed through a thickness of each base 468, 416 from the top side 464 and the bottom side 448 of each base. As later discussed, fasteners may be threaded and/or disposed through fastener holes 431 in order to secure a set of slide plates (e.g. slide plates 1124 and 1126 shown in FIG. 11) to each base 468, 416. Accordingly, each base 468,416 may be used to retain frame 402 and any components attached thereto to a housing of light device 102.

As shown in FIG. 4, a yoke assembly, such as yoke assembly 302 is already located within an interior of frame 402. Shaft connector end 306 can be seen protruding from a side of frame 402, as well as a portion of yoke lobes 315 and 317 which are protruding from a set of apertures formed in the side walls of frame 402.

In addition to enclosing yoke assembly 302, frame 402, in one or more embodiments, may be used to support a driver used to operate and actuate a set of light emitting diodes, such as light emitting diodes 604. In one or more embodiments, protruding elements 434 may be disposed on only one of the sidewalk of the pair of sidewalls 410, such as first sidewall 412. As shown in FIG. 6, on the second side wall 414, set of apertures 432 may extend therethrough without having protruding elements 434. Alternatively, frame 402 may be designed to include protruding elements 434 on either sidewall of the pair of sidewalls 410 in other embodiments.

As shown in FIG. 4, fastener 437 may be located through a dedicated hole located on each of the protruding elements 434. In one or more embodiments, fastener 437 may be removed and a support plate or support bracket, (e.g. support plate 852 as shown in FIG. 8), may be connected to each protruding element 434 by coupling support plate 852 to protruding elements 434. Support plate 852 as shown in FIG. 8 and elsewhere may include fastener holes disposed at a top of support plate 852 for a fastener, such as fastener 437 to be inserted therein.

As shown in FIG. 8, support plate or support bracket 852 may be angled downwardly and extend away from first sidewall 412. Enough distance may be provided between a top of support bracket 852 and first sidewall 412 so that support bracket 852 may accommodate LED driver 854 (e.g. as shown in FIGS. 8-11).

An LED driver, such as LED driver 854, may have multiple functions. LED driver 854 may regulate power distribution to the associated set of light emitting diodes (e.g. set of light emitting diodes 604). Further, LED driver 854 may function to regulate a temperature of the set of light emitting diodes 604 so that set of light emitting diodes 604 do not overheat and/or burn out or otherwise malfunction. Any LED driver suitable for use with a set of light emitting diodes as known in the art or as yet may be developed may be used for LED driver 854.

It is noted that set of light emitting diodes 604, when energized and powered on, may produce a significant amount of heat over time. Advantageously, in addition to serving as a support frame for couple and securing one or more components within light device 102, frame 402 may also function as a heatsink. A heatsink, as known in the art, is a structure or set of elements that provides a thermal pathway to move heat away from a desired area. Frame 402, may be absorb heat produced by set of light emitting diodes 604 and as such direct the undesired heat away from light emitting diodes 604 and ultimately to the ambient environment. A thermal pathway may be provided to move heat from light emitting diodes 604 via frame 402 and also via a housing alight device, such as housing 104 of light device 102 (as shown in FIG. 1 and FIG. 2). In one or more embodiments, heat may be directed from light emitting diodes 604, through frame 402, to a back surface of housing 104, where a set of fins 202 as shown in FIG. 2 may be located. Set of fins 202 may provide an additional thermal pathway for the excessive heat generated by set of light emitting diodes 604 to be directed away from light device 102 and to the ambient environment. Thus, light device 102 may include a thermal pathway to move excess heat away and prevent damage from overheating.

As shown in FIG. 4, in one or more embodiments, frame 402 may further include a set of locator pins 422 that may be located on a side surface of each of the pair of sidewalls 410. While not shown in FIG. 4, on an opposing side surface of each of the pair of sidewalls 410, there may be a set of locator holes 424, which may be seen in FIG. 13. As shown in FIG. 4, four locator pins 422 are dispersed around a side surface of each of the pair of sidewalls 410. Two locator pins 422 are disposed towards the top of each side surface, and two locator pins 422 are disposed towards each bottom side of each of the pair of sidewalls 410. Those of ordinary skill in the art will appreciate that a greater or lesser number of locator pins and corresponding locator holes may be used in alternative embodiments. The function and purpose of locator pins 422 and locator holes 424 will be discussed in greater detail below with respect to FIG. 12 and FIG. 13.

Turning to FIG. 5, FIG. 5 shows an exploded view of an optical assembly in accordance with one or more embodiments provided herein. As shown in FIG. 5, in one or more embodiments, an optical assembly, such as optical assembly 502, may include an optical face plate (or plate) 504, a set of optical components 508, and a set of optical covers 522. Those of ordinary skill in the art will appreciate that optical assembly 502 may include solely set of optical components 508. In other embodiments, optical assembly 502 may include set of optical components 508 and faceplate 504 (whereby a set of back covers 522 is not included in such an embodiment). Other alternative configurations for optical assembly 502 may also be within the scope of the present disclosure.

Set of optical components 508 may be a set of optics. As used herein, set of optics may include, without limitation, lenses, reflectors, total internal reflecting (TIR) optics having embedded lenses. As used herein, the term "optics" or "optical components" may refer to any component used to direct or manipulate a light beam along a light trajectory from a set of light sources, such as, without limitation, the set of light emitting diodes 604 shown in FIG. 6. For instance, the set of optics, as used herein, may refer to an assembly of lenses, reflectors, TIR components, optic light filters such as thin films, or any combination thereof.

As stated above, set of optical components 508 may specifically be a set of optic lenses. Any type of suitable optic lenses as known in the art or as yet to be discovered may be used for set of optical components 508. Further, set of optical components 508 may be made of any suitable material.

In one or more embodiments, set of optical components 508 may specifically be formed as a total internal reflection (TIR) optic lens with an embedded plano-convex lens (as shown in FIG. 5, FIG. 7, and FIGS. 9 and 10). Further, the TIR optic lens with the embedded plano-convex lens may be made of a rigid material. A TIR optic may also be described herein as an internal reflecting optic or an internal reflection optic. Alternatively, it is noted that, in some embodiments, set of optical components 508 may not necessarily be an internal reflection optic, but rather a non-internally reflecting optic having a plano-convex lens embedded therein.

As discussed in U.S. Pat. Nos. 9,423,090 and 9,423,092, a TIR optic may advantageously assist in providing a more focused and uniformly directed light. Instead of allowing light beams produced by a light source (e.g. such as light emitting diodes 604) to "fan out" along the outside edges, a TIR optic lens, by virtue of its shape and structure, may redirect the light beams directly ahead and in a direction where a user would want the light to be directed.

Other optic lens may also be used in some embodiments, including the optic lenses and their respective arrangements as described in U.S. Pat. Nos. 9,423,090 and 9,423,092, which are assigned to the present assignee and which are incorporated herein in their entirety. Further, it is noted that rather than using optic lenses for a set of optical components 508, reflectors may be utilized in some embodiments.

As shown in FIG. 5, in one or more embodiments, set of optical components 508 may include one or more TIR optics, such as TIR optic 510, with an embedded plano-convex lens, such as embedded plano-convex lens 509. TIR optic 510 may further include a hollow channel, such as hollow channel 512. Hollow channel 512 may also be described as a passageway or bore that extends through a rear surface of TIR optic 510 and terminates at an interior point within TIR optic 510. In other words, hollow channel 512 does not extend all the way through TIR optic 510 from a rear surface to a front surface, but rather extends partially through TIR optic 510 (as more clearly shown in FIG. 7). In one or more embodiments, hollow channel 512 may have a conical or cylindrical shape. According to embodiments of the present disclosure, hollow channel 512 may be wide enough and extends deep enough within TIR optic 510 (and each optical component of set of optical components 508) to fit over a light source in light device, such as light emitting diodes 604. Further, TIR optic 510 may be generally parabolic shaped, whereby a front surface of the embedded plano-convex lens 509 may be located at a center of the TER optic. One or more surfaces of TIR optic 510 may converge or angle inwardly towards the embedded plano-convex lens 509, in one or more embodiments, and as shown in FIG. 5.

Set of back covers 522 may be described as a set of protective covers that is disposed over set of optical components 508. Set of back covers 522 may have the same shape and structure as set of optical components 508, but may have slightly larger dimensions in order to enclose or contain set of optical components 508. In other words, each back cover of the set of back covers 522 is hollow and corresponds in shape to each optical component of set of optical components 508. In terms of overall dimensions, set of back covers 522 may be slightly larger in dimension than set of optical components 508 so that set of back covers 522 may enclose or encase set of optical components 508.

As shown in FIG. 5, in one or more embodiments, set of back covers 522 may have a larger circular or oval (or other shaped) opening 534 or bore that extends from a front surface 536 of each back cover 522 of the set of back covers 522 to the rear surface 535 of each back cover 522. Thus, both the front surface 536 and the rear surface 535 of set of back covers 522 is not a solid surface but is configured to have an opening 534 and an inner bore or cavity as shown in FIG. 5 (and as shown in FIG. 7).

Accordingly, each optic lens or optical component forming set of optical components 508 may have a hollow cavity 512 that is thus not blocked or obstructed by a solid rear surface of each back cover 522. Rather, the circular or oval opening 534 located at a rear surface of each back cover 522 may thus allow access to hollow cavity 512 of each optical component of set of optical components 508.

Beneficially, set of back covers 522 may be used to provide a more uniform and aesthetically pleasing look. When light device 102 may be fully assembled and ready to be used, set of back covers 522 may provide a solid background so that one or more interior components of light device 102 (e.g. yoke assembly 302 and frame 402) are not visible to an outside viewer looking directly at a front surface 136 of housing 104 of light device 102. Having set of back cover 522 may help to provide a less cluttered, polished, and more aesthetically pleasing look to light device 102. It is noted that in alternative embodiments, set of back covers 522 may optionally not be utilized. In addition, set of back covers 522 may be used to couple moveable member 442 and 458 to a portion of set of back covers 522 (e.g. on a rear surface 560 of set of back covers).

As shown in FIG. 5, set of back covers 522 may include ridges 523 on both an exterior and interior surface of set of back covers 522 that cascade in the form of larger to smaller concentric circles. Such ridges 523 may optionally be utilized for enhanced cosmetic appearance of optical assembly 502.

As mentioned above, optical assembly 502 may further include faceplate 504. Faceplate 504 may be a plate like structure that fits over or covers a front surface of set of optical components 508. Faceplate 504 may serve multiple purposes. Understandably, faceplate 504 may function as a protective cover for set of optical components 508. Further, faceplate 504 may also act as a structure to which one end of a set of moveable members, such as set of moveable members 442 and 458 (as shown in FIG. 4 and FIG. 6), may be attached. More discussion about this structural arrangement and manipulation of a position of optical assembly 502 within a light device, such as light device 102 is provided below in the present description with respect to FIG. 6.

Faceplate 504 includes a set of optical openings 506. As shown in FIG. 5, faceplate 504 has three optical openings 506 that correspond to the three individual optical lenses used for the set of optical components 508. As mentioned above, the term "set" as used herein may refer to one or more of any item. Accordingly, in some embodiments, optical assembly 502 may include a plurality of optical components, such as the three optical lenses (e.g. a number of individual TIR optic lenses 510 each having an embedded plano-convex lens 509). Alternatively, optical assembly 502 may include solely a single optical component for set of optical components 508. In one or more embodiments, as shown in FIG. 5, each optical lens of the set of optical components 508 is connected to each other via connecting pieces 516.

In one or more embodiments, the number of optical components included in set of optical components 508 corresponds to the number of light sources disposed in light device 102 (e.g. per modular optical unit, such as modular optical unit 602, as will be further elaborated on below with respect to FIG. 6). Accordingly, if there are three light emitting diodes (such as light emitting diodes 604 in FIG. 6), then there are at least three optical lenses that make up the set of optical components 508, and at least three optical component openings 506 present in faceplate 504.

Faceplate 504 may have a body whose width and length are larger than set of optical components 508 and set of back covers 522, although alternative dimensions and configurations may be utilized in alternative embodiments. In one or more embodiments, a diameter 524 of each optical component opening 506 in faceplate 504 is the same as a diameter of optic lens 510 of the set of optical components 508.

Further, one or more recessed portions 526 may be located in a rear surface 528 of faceplate 504. As shown in FIG. 5, recessed portion 526 may be circular in shape and have an outer diameter that is larger than diameter 524 of the optical component opening 506.

To assemble optical assembly 502 according to one or more embodiments, faceplate 504 may be placed over set of optical components 508 such that a rear surface 528 of faceplate 504 fits over a front surface of each optical component of set of optical components 508. A front side of each optical component of the set of optical components 508 may be visible through each optical component opening 506 of faceplate 504.

In one or more embodiments, faceplate 504 may be coupled to set of optical components 508. In one embodiment, an outer protruding edge 530 (e.g. circular outer protruding edge) of each optical component of the set of optical components 508 may be press fit or slidably located within recessed portion 526 located in the rear surface 528 of faceplate 504. Other means of attaching or coupling set of optical components 508 to a rear surface 528 of faceplate 504 may be used, including, without limitation, fasteners, adhesives, soldering, welding, or any other attachment means known in the art.

In an embodiment whereby set of back covers 522 may be included within light device 102, a front surface 536 of set of back covers 522 may be brought towards a rear surface of set of optical components 508. Set of back covers 522 may include a number of fastener holes 519 located on the set of back covers 522, whereby these fastener holes 519 correspond in dimension and placement to the dimension and placement of fastener holes 518 disposed on faceplate 504. Accordingly, in one or more embodiments, when fasteners, such as fasteners 517 are secured in their respective places (i.e. through fastener holes 518 disposed on faceplate 504 and fasteners holes 519 disposed through set of back covers 522), faceplate 504 may be securely coupled to set of optical components 508 and also to set of back covers 522. Thus, optical assembly 502 may include faceplate 504 securely coupled to set of optical components 508 as well as set of back covers 522, which are affixed to faceplate 504 via fasteners 517.

In addition to the above, to secure one or more moveable members, such as moveable members 442 and 458 to optical assembly 502, additional fastener holes may be included on faceplate 504, set of optical components 508, and set of back covers 522 for a set of fasteners (e.g. fasteners 608 shown in FIG. 6) to be located therethrough. As shown in FIG. 5, fastener holes 520 are located on faceplate 504. In addition, fastener holes 525 are located on connecting piece 516 of set of optical components 508 and fastener holes 570 may be located on set of back covers 522. Fastener holes 520, 525, and 570 may have relatively the same dimensions and placement so that fasteners 608 (e.g. shown in FIG. 6) may be located through each fastener hole 520, 525, and 570. Further, in one or more embodiments, fasteners 608 may be coupled (e.g. threadably coupled) through each fastener hole 520, 525, and 570, and securely located through the bores 449 of each moveable member 442,458, which will be further discussed below with respect to FIG. 6.

FIG. 6 shows an exploded perspective view of various components of a modular optical unit that may be disposed within a light device in accordance with one or more embodiments described herein. Light device 102 may include a number of modular optical units, such as modular optical unit 602. As will be discussed with respect to FIGS. 12 and 13, any number of modular optical units in accordance with modular optical unit 602 may be coupled and aligned to be located within an interior of light device 102.

As shown in FIG. 6, modular optical unit 602 may include yoke assembly 302 (e.g. as shown in FIG. 3), frame 402 (e.g. as shown in FIG. 4), and optical assembly 502 (e.g. as shown in FIG. 5), as well as other components to be further described below. In one or more embodiments, yoke assembly 302 may be coupled to an underside 480 of frame 402. On the opposing side of frame 402, an optical assembly, such as optical assembly 502, may be coupled to the front side of frame 402.

More specifically, yoke assembly 302 may include shaft 304 with integrated cams 312 and 313, and may further include yoke 314. To combine the components of yoke assembly 302, according to one or more embodiments, shaft 304 may be slid or otherwise inserted through the bores of each yoke lobe 315 and 317 as previously described.

A fastener, such as fastener 607, may be inserted through fastener hole 324 in connecting bar 318 (shown in FIG. 3) and through bore 449 of moveable member 442, so as to couple a proximal end 444 of moveable member 442 to yoke 314. The same procedure may be used to connect a proximal end 460 of moveable member 458 to yoke 314. As shown in FIG. 6, there are at least two fasteners 607. Anther fastener 607 may be inserted through the other fastener hole 324 located through connecting bar 318 of yoke 314 and coupled to end 460 of moveable member 458.

Subsequently, with yoke assembly 302 attached thereto, moveable members 442 and 458 may be moved proximate to an underside 480 of frame 402 and inserted through their respective channel of the set of moveable member channels 440. Bushing 446, may be have already been disposed within each channel of the set of moveable member channels 440 prior to sliding each moveable member 442 and 458 within bore 456 of bushing 446. In one or more embodiments, moveable members 442 are slideable elements that are adapted to slide easily in a forwards and backwards direction within the interior bore 456 of bushing 446. As previously stated, in one or more embodiments, bushing 446 may be press fit into each moveable member channel 440.

Further, when coupling yoke assembly 302 to an underside 480 of frame 402, a front surface of connecting bar 318 may be closest to recessed interior portion 436 of frame 402. Also, a portion of each yoke lobe 315, 317 may protrude through each respective aperture 432 that extends through first sidewall 412 and second sidewall 414 of frame 402.

To further hold yoke assembly 302 in place, a pair of shaft clamps 640 may be used in one or more embodiments. Thus, fasteners 605 may be used to fasten each shaft clamp of the pair of shaft clamps 640 to recessed interior portion 436 located on an underside 480 of frame 402. While shaft clamps 640 may assist in securing yoke assembly 302 in place, it is noted that shaft 304 is still capable of rotating a full 360 degree turn (either in a forward or reverse direction). Shaft clamps 640 do not prevent shaft 304 from rotating or turning.

Figure 9:
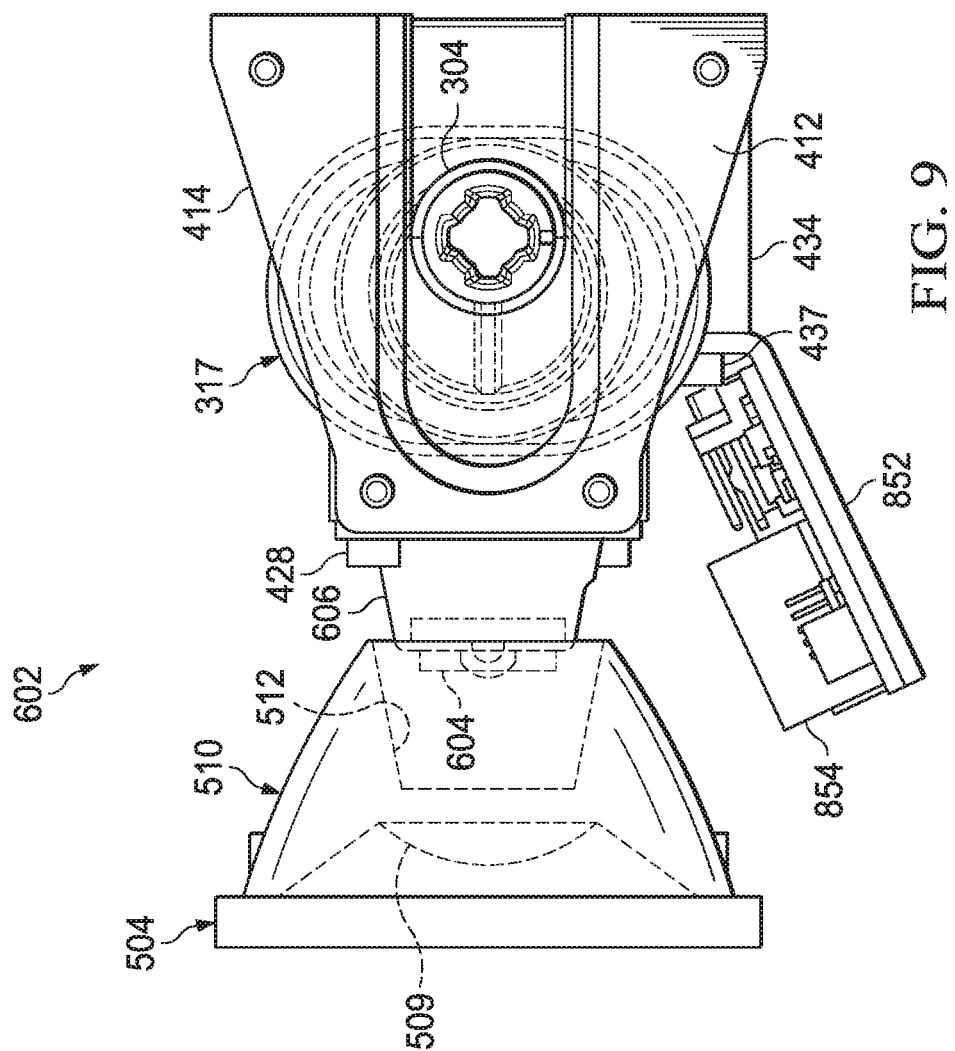
FIG. 9 is an illustration from a side view of a modular optical unit configured for producing a spotlight in accordance with an illustrative embodiment.

In one or more embodiments, to complete assembly of modular optical assembly 602, a set of light emitting diodes 604 may be located on each respective pedestal or mounting surface of the set of mounting surfaces 426 located on a front side of frame 402. As shown in FIG. 6, there are three individual light emitting diodes 604 and each one may be placed on each corresponding pedestal or mounting surface 426. Once each light emitting diode 604 has been located on its respective pedestal or mounting surface 426, LED caps 606 may be placed over each light emitting diode 604. According to one or more embodiments, one or more LED cap screws, such as LED cap screw 428 as shown in FIG. 4 and FIG. 6 may be used to fasten LED caps 606 to a front side of front planar surface 406 of frame 402 in order to hold each light emitting diode 604 in place. It is noted that one or more wires may be connected to each light emitting diode 606 and also to a designated LED driver, such as LED driver 854 as shown in FIGS. 8-9 in order to provide power and regulate each light emitting diode 604.

It is noted that optical assembly 502 may be assembled as a unit and secured together as previously discussed above with respect to FIG. 5. Alternatively, individual components of optical assembly 502 may be coupled to moveable members 442 and 458 or other components of frame 402 in an order and fashion other than the process as described above with respect to FIG. 5.

In one embodiment, in order to complete modular optical assembly 602 as shown in FIG. 6, it may be desirable to secure optical assembly 502 to moveable members 442 and 458. Accordingly, to secure optical assembly 502 to moveable members 442 and 458, fasteners 608 may be inserted through fastener holes 520 disposed on faceplate 504, through fastener holes 525 on connecting pieces 516 of set of optical components 508, and through fastener holes 570 located on the set of back covers 522. Once inserted completely therethrough the abovementioned fastener holes, fasteners 608 may be secured to end 443 of moveable member 442 and to end 462 of moveable member 458. In one or more embodiments, fastener 608 may be located through the designated fastener holes 520, 525, and 570 of optical assembly 502, and also have thread or length to continue to pass through each respective bore 449 of each moveable member 442 and 458. Thus, according to one embodiment, modular optical assembly unit 602 may be assembled. Those of ordinary skill in the art will appreciate that the order for assembling one or more components of modular optical assembly unit 602 may vary from the order provided above. Furthermore, components may be modified and rearranged in an arrangement other than as described above.

In particular, it is contemplated that modular optical assembly unit 602 may include a lesser number or greater number of light emitting diodes than the three light emitting diodes 604 shown in FIG. 6. Modular optical assembly unit 602 may include any number of light emitting diodes 604 (or other types of light sources) as desired, including having solely a single light emitting diode 604 or other type of light source. In one or more embodiments, the number of optical components, such as optical components 508 in optical assembly 502, may correspond to the number of light emitting diodes 606.

When modular optical assembly unit 602 is assembled, each optical component 508 may fit over each light emitting diode 604 that is secured to a front surface (e.g. mounting surface 426) of frame 402. As previously described, hollow channel 512 is configured to allow each optic of optical components 508 to fit over each LED cap 606 and each underlying light emitting diode 604 (e.g. as shown in FIG. 7). In one or more embodiments, a shape and dimension of LED cap 606 is designed to comfortably fit within a perimeter of hollow channel 512 for each optic lens of optical components 508.

FIG. 7 shows a partially cross-sectional view of a modular optical assembly unit, such as modular optical unit 602 shown in FIG. 6, according to one or more embodiments. FIG. 7 may provide a clearer view of modular optical assembly unit 602 as assembled according to one or more embodiments. As shown, when assembled in modular optical unit 602, yoke assembly 302 may be contained within cavity 438 of frame 402. FIG. 7 shows a sectional view such that only one sidewall of frame 402, i.e. second sidewall 414, is visible in FIG. 7.

Shaft clamps 640 may be used to retain shaft 304 against the underside 480 of frame 402, and more specifically, against the recessed interior portion 436 located on the underside 480 of frame 402. Further, fasteners 607 may be configured to retain connecting bar 318 of yoke 314 to an underside 480 of frame 402. Fasteners 607 may be threadably joined or secured to pass through fastener holes 324 that are formed at one or more locations on connecting bar 318 of yoke 314. Fasteners 607 may further pass through the bore 449 of each moveable member 442 and 458 (as shown in FIG. 7) at proximal ends 444 of moveable member 442 and 460 of moveable member 458. In one or more embodiments, bushings 446 may also be inserted within each designated bore of moveable member channels 440, and thereafter, moveable members 442 and 458 may be located within the bore 456 of each bushing. Accordingly, yoke assembly 302 may be coupled to frame 402 and moveable members 442, 458 may be coupled to a rotational shaft, such as shaft 304.

At an opposite end or distal end of each moveable member 442 and 458, as shown in FIG. 7, fasteners 608 may be coupled to optical assembly 502. As previously described above, fasteners 608 may be threaded or otherwise secured through fastener holes 520 located on faceplate 504, fastener holes 525 in each connecting piece 516 of set of optical components 508, and fastener holes 570 located through a portion of set of back covers 522. Thus, each moveable member 442 and 458 may be secured to a rear surface of optical assembly 502 (ex. rear surface 560 of set of back covers 522) at one end and also be secured at the opposing end of moveable member 442 and 458 to connecting bar 318 of yoke 314. Nevertheless, moveable member 442 is configured to slide or move in a linearly forward and backward direction within each modular optic unit assembly 602 (such as, for example, via motion imparted to each moveable member 442 and 458 when shaft 304 rotates, causing yoke 314 to linearly move forward and backwards). Responsive to the movement of yoke 314 in a (linearly) forward and backward direction, optical assembly 502 may also be moveable linearly forward and backwards, such that optical assembly 502 is moveable towards and away from each light emitting diode 604.

As shown in FIG. 7, each LED cap 606 may be located on top of each light emitting diode 604 to hold each light emitting diode 602 to each pedestal 426 formed on a front surface 406 of frame 402. As shown in FIG. 5, a rear surface 535 of each back cover of the set of back covers 522 includes an opening 534. As further shown in FIG. 7, in one or more embodiments, each optic lens included in the set of optical components 508 may be a TIR optical lens (e.g. TIR optical lens 510) having an embedded plano-convex lens, such as plano-convex lens 508. Hollow channel 512 of each TIR optical lens 510 may extend partially through a rear surface of TIR optical lens 510 as shown in FIG. 7, whereby hollow channel 512 is configured to fit over LED cap 606 and each light emitting diode 604, which is disposed under each LED cap 606. Thus, FIG. 7 provides a clearer view of modular optical unit 602 when one or more components are assembled together according to one or more embodiments.

Turning to FIG. 8, FIG. 8 shows a perspective view of an embodiment of a modular optical unit according to one or more embodiments. FIG. 8 further shows an LED driver attached to frame 402 of a modular optical unit, such as modular optical unit 602, that may be used in light device 102 to both produce an output of light and to manipulate one or more characteristics of that output of light.

FIG. 8 shows a perspective view of optical assembly 502 coupled to frame 402 and also having yoke assembly 302 coupled to an interior of frame 402. FIG. 8 shows how shaft 304 is located within cavity 438 of frame 402, and more specifically, fixedly coupled to recessed interior portion 436 of frame 402. A designated receiving end, (e.g. receiving end 308), of shaft 304 is visible in the perspective view of FIG. 8.

A portion of yoke lobes 315 and 317 of yoke 314 is shown protruding from each aperture 432 formed through second sidewall 414. While not visible in FIG. 8, there are also apertures 432 (e.g. same dimensions and placement) formed in first sidewall 412 that are in alignment with the apertures 432 present in second sidewall 414.

Further, FIG. 8 illustrates how a support plate 852 may be affixed to a first sidewall 412 of frame 402 and a driver, such as LED driver 854 may be securely located or attached to support plate 852 and thus be included as a component of modular optical unit 602. LED driver 854 may be any type of driver as known in the art or as yet to be developed, including, without limitation, constant voltage and/or constant current type LED drivers. LED driver 854 may function as a power supply unit (e.g. via conducting power provided by an alternative power source, such as, for example, a vehicle batter) and power regulator for the light emitting diodes 604 (even when light emitting diodes 604 are arranged as an array and in series). LED driver 854 may further assist to regulate power distribution to light emitting diodes 604 particularly when temperatures within light device 102 are extremely high or low or when light emitting diodes 604 may have a high temperature due to overheating.

Each modular optical unit 602 disposed in a light device 102, in one or more embodiments, may have its own LED driver, such as LED driver 854, to provide the necessary power and monitoring of the light emitting diodes located on each modular optical unit 602 (e.g. as shown in FIG. 12 and FIG. 13).

In one or more embodiments, power may be supplied to each light emitting diode 604 via LED driver 854 from a battery (not shown) disposed within a vehicle to which light device 102 may be attached. As known to those of ordinary skill in the art, wires or cables may be run from the vehicle battery and through a housing 104 of light device 102 to LED driver 854. Additional wires may be connected from LED driver 854 to each light emitting diode 604, thus supplying the necessary power to each light emitting diode 604. Alternative methods of providing power to the light emitting diodes 604 may also be used by those skilled in the art. For example, power may be supplied by running wires or cables from LED driver 854 to a vehicle engine, as opposed to a battery, located in the corresponding vehicle to which light device 102 may be attached. Alternatively, light device 102 may include its own power source (not shown), including having its own set of batteries or other power module. It is noted that LED driver 854 may be capable of converting incoming AC power to the proper DC voltage, and may further regulate the current flowing through each light emitting diode 604 during operation of light device 102. LED driver 854 may include a number of electronic components as known in the art, including, without limitation, any number of integrated circuits (ICs), processing units (e.g. CPU's, microprocessors), other chips or microchips, printed circuit boards (PCBs), or combinations thereof.

Figure 10:
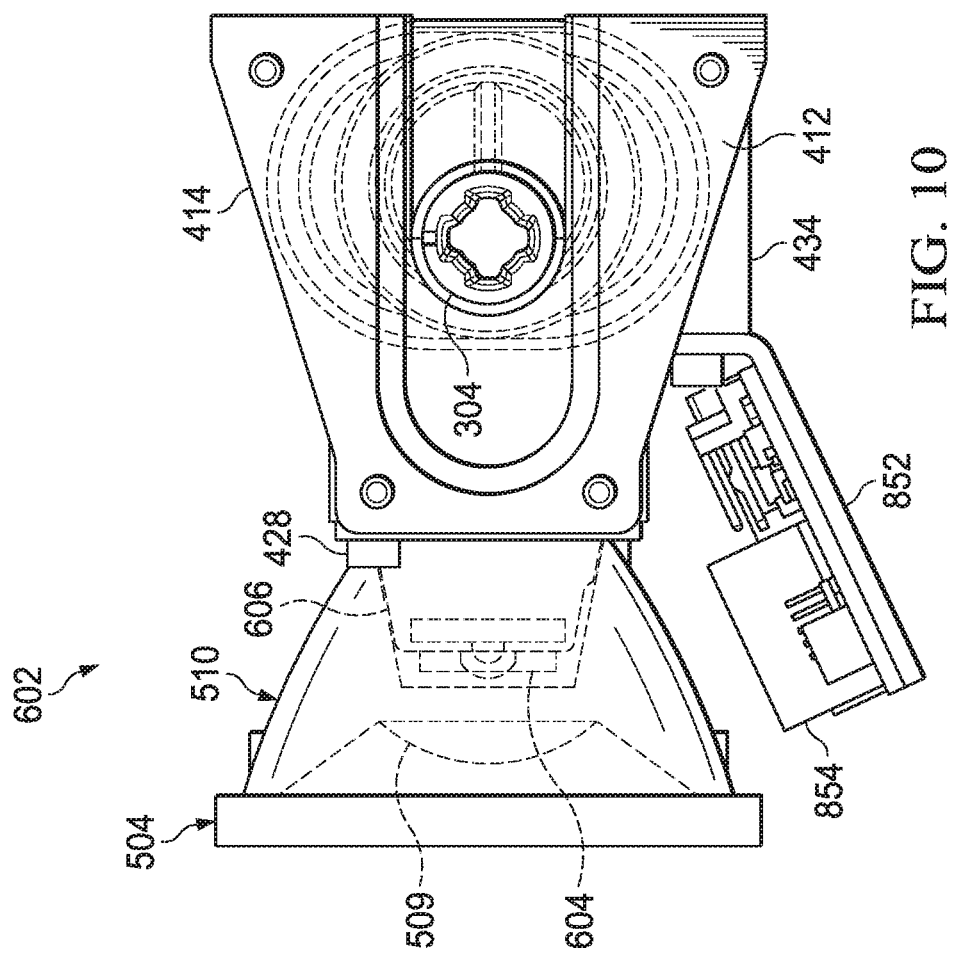
FIG. 10 is an illustration from a side view of a modular optical unit configured for producing a floodlight in accordance with an illustrative embodiment.

Turning to FIGS. 9 and 10, FIGS. 9 and 10 show side views of a modular optical unit according to one or more embodiments described herein. One or more components of FIGS. 9 and 10 may have visible dotted lines to indicate that they are located within modular optical unit 602 and behind one or more solid surfaces, whereby they may not be visible to the user's eye from the side elevation views shown in FIGS. 9 and 10. Nevertheless, these views may provide further understanding of the arrangement of components according to one or more embodiments of modular optical unit 602.

As previously discussed, modular optical unit 602 is configured such that optical assembly 502 is moveable from a first position to a second position over a specific range of distance. By virtue of a displacement of optical assembly 502 as located in modular optical unit 602, either linearly away from or towards light emitting diodes 604, the angle of light spread of light beams produced by light emitting diodes 604 may be varied and adjustable, and produced as either a spotlight (narrow angle of light spread) or a floodlight (wider area angle of light spread).

Accordingly, FIG. 9 shows a side view of a modular optical unit that may be used to produce a spotlight according to embodiments described in the present description. FIG. 10 shows a side view of a modular optical unit that may be used to produce a floodlight according to embodiments described in the present description. In both FIG. 9 and FIG. 10, modular optical unit 602 may be in accordance with the description provided above for modular optical unit 602 and its one or more components.

In FIG. 9, optical assembly 502 is shown extended away (i.e. linearly moved in a forward direction away) from light emitting diode 604, which results in the production of a spotlight. In FIG. 10, optical assembly 502 is retracted towards (i.e. linearly moved in a backwards direction) light emitting diode 604, which results in the production of a floodlight. Displacement of optical assembly 502 in a forward or backwards direction may be achieved by rotating shaft 304 a desired amount either forward or backwards so as to achieve either a floodlight effect or a spotlight effect. In one embodiment, shaft 304 may be rotated a particular amount that corresponds to the desired angle of light spread selected by a user and/or user controller. In one implementation, optical assembly 502 may be extended a minimum distance away from light emitting diode(s) 604 to produce a spotlight.

Although not shown in the present description, it is noted that an associated controller may be coupled to light device 102. A user may select or interact with one or more interfaces disposed on such a controller in order to select a desired angle of light spread, and thus determine whether each modular optical unit 602 produces a spotlight or a flood light.

To produce a spotlight, in one or more embodiments, moveable members 442 and 458 may be moved in a forward direction a minimum or suitable distance away from light emitting diode 604 in order to produce a spotlight. Depending on the length of moveable members 442 and 458, there may also be a maximum distance that optical assembly 502 may be extended, keeping into consideration that moveable members 442 and 458 are secured on both ends. To produce a floodlight, in one or more embodiments, moveable members 442 and 458 may be moved or retracted in a backwards direction a minimum distance towards light emitting diode 604 as allowed by the space available and length of moveable members 442 and 458. In one implementation, optical assembly 502 may be positioned a minimum distance proximate to light emitting diode(s) 604 to produce a floodlight, including being retracted a minimum distance toward light emitting diode(s) 604 if optical assembly 502 was positioned too far away from light emitting diode(s) 604 for a floodlight to be produced.

As shown in FIG. 9, hollow cavity 512 of optical component 510 (which is part of the set of optical components 508) may also be extended away from light emitting diode 604 when a spotlight is produced. Conversely, FIG. 10 shows that hollow cavity 512 of optical component 510 may be located proximate to light emitting diode 604 when a floodlight is produced. The light beams as emitted through optical component 510, whereby optical component 510 is a TIR optical component having embedded plano-convex lens 509, are altered by virtue of a displacement of optical assembly 502 towards and away from light emitting diode 604. It is considered advantageous to utilize a TIR optical component having an embedded plano-convex lens, such as TIR optical component 510 and embedded plano-convex lens 509, to produce a better quality of light output, although other lenses may be utilized as well in alternative embodiments.

Figure 11:
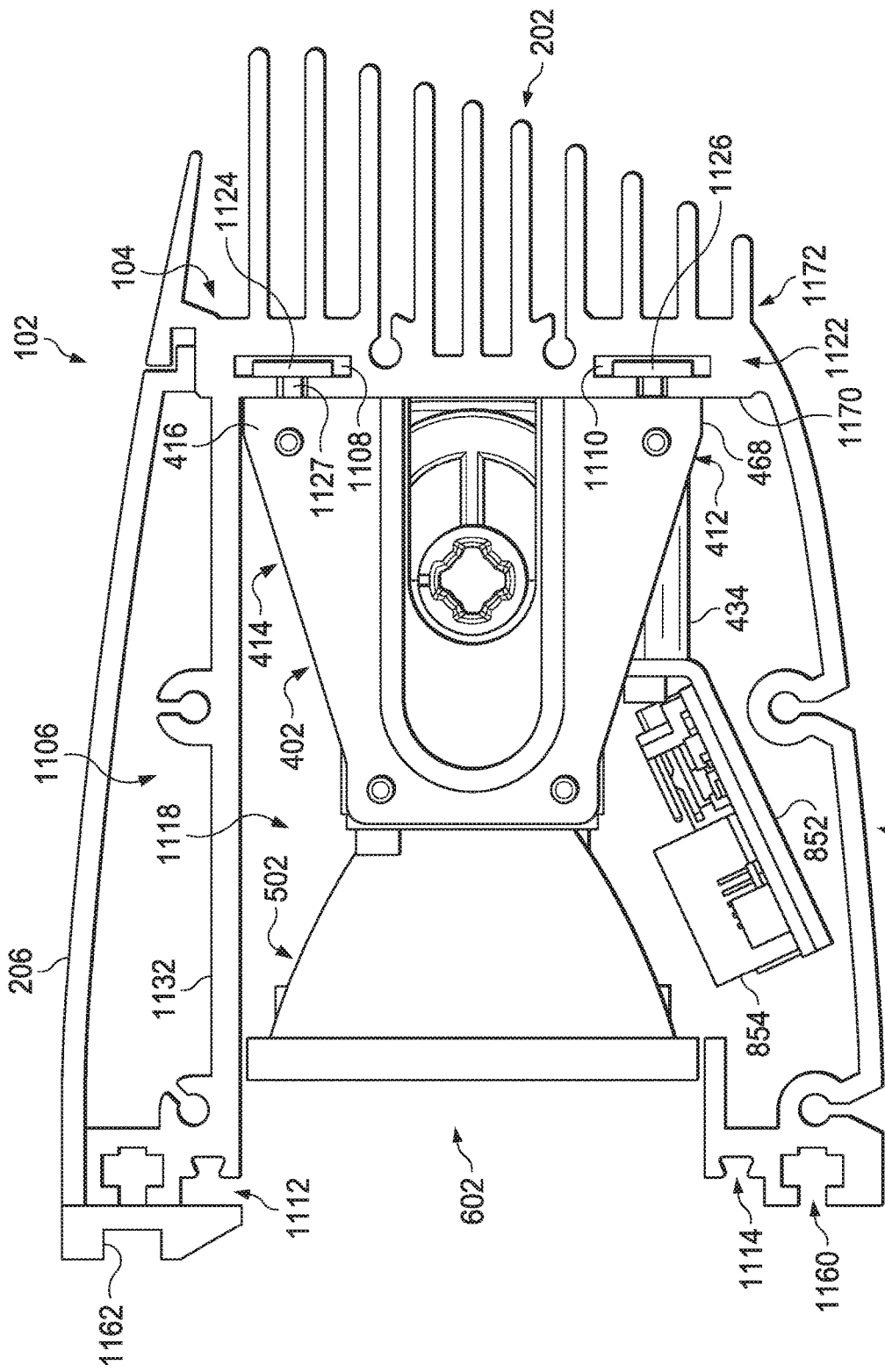
FIG. 11 is an illustration as a side view of a light device having a modular optical assembly in accordance with an illustrative embodiment.

Turning to FIG. 11, FIG. 11 is a side view of a light device having a modular optical assembly in accordance with one or more embodiments described in the present description. Modular optical unit 602 may be a modular optical unit as previously described above in FIG. 6, and may include optical assembly 502 coupled to frame 402 as well as yoke assembly 302 attached to frame 402 and generally located within an interior located cavity 438 of frame 402.

FIG. 11 shows a partial, skeleton view of a housing, such as housing 104 of light device 102. FIG. 11 may assist in providing a better understanding of how a modular optical unit 602, such as modular optical unit 602 may be held in place and secured within an interior of the housing 104 of light device 102.

In one or more embodiments, housing 104 may include a top surface 1132, bottom surface 1134, and back wall 1122. Top surface 1132, bottom surface 1134, and backwall 1122 may generally define an interior cavity 1118 formed within housing 104. Backwall 1122 may be a backwall that acts as a rear surface 140 of housing 104 as previously discussed with respect to FIG. 1.

As discussed above with respect to FIG. 4, frame 402 may include, in one or more embodiments, a first base 468 (e.g. as shown in FIG. 4) coupled to a bottom edge of first sidewall 412 and may further include a second base 416 coupled to a second sidewall 414. Alternatively, each base 468, 416 may be integrally formed along with first sidewall 412 and second sidewall 414. Each base 468, 412 may have a base top side 464 and a base bottom side 448 (e.g. as shown in FIG. 4).

In one or more embodiments, housing 104 of light device 102 may have a backwall 1122 that is located on a rear surface 140 of housing 104 of light device 102. As previously discussed with respect to FIG. 2, a set of fins 202 may extend across a length of backwall 1122 of housing 104, and on an exterior facing side 1172 of backwall 1122. On an interior facing side 1170 of backwall 1122, there may be an upper slide bracket channel 1108 and a lower slide bracket channel 1110.

In one or more embodiments, back wall 1122 extends across the longer side of housing 104. Accordingly, upper slide bracket channel 1108 and lower slide bracket channel 1110 may also extend all the way across the longer side of housing 104. Thus, in one or more embodiments, upper slide bracket channel 1108 and lower slide bracket channel 1110 may extend along the full length of the inner surface 1170 of back wall 1122 of housing 104. Alternatively, in other embodiments, upper slide bracket channel 1108 and lower slide bracket channel 1110 may only extend a partial distance along the length of back wall 1122.

In one or more embodiments, upper slide bracket channel 1108 and lower slide bracket channel 1110 may be adapted in dimension to accommodate one or more slide brackets, such as upper slide bracket 1124 and lower slide bracket 1126. In the present description, slide brackets may interchangeably be referred to herein as guiding plates. Slide brackets 1124, 1126 may be used to secure modular optical unit 602 to an interior surface 1170 of the backwall 1122 of housing 104. Slide brackets 1124, 1126, in one or more embodiments, may be generally rectangular members that are sized to fit (e.g. thin body) within upper side bracket channel 1108 and lower slide bracket channel 1110. Although any material may be used to make slide brackets 1124 and 1126, in one or more embodiments, slide brackets 1124 and 1126 may be manufactured either in whole or in part from any metal known in the art.

According to an exemplary embodiment, lower slide bracket 1126 may be coupled to a bottom surface (e.g. base bottom side 448 of first base 468) of first sidewall 412 of frame 402. Further, upper slide plate 1124 may be coupled to a bottom surface (e.g. base bottom side 448 of second base 416) of second sidewall 414 of frame 402. Further, slide brackets 1124 and 1126 may include one or more fastener holes. Fastener holes may be formed through each slide bracket in order to be able to use fasteners (e.g. fasteners 1127) to attach modular optical unit 602 to each slide bracket 1124 and 1126.

To couple slide brackets 1124, 1126 to each base 468, 416, slide brackets 1124, 1126 may be pressed against the bottom side 448 of each base 468, 416 and oriented such that the fastener holes formed through a thickness of each slide plate 1124, 1126 may be aligned with fastener holes 431 (shown in FIG. 4 and discussed above) extending through a thickness of each base 468, 416. Subsequently, fasteners 1127 may be located through the fastener holes of each slide bracket 1124, 1126 and through the fastener holes 431 (as shown in FIG. 4) formed through each base 468, 416.

For example purposes only, and without limitation as to alternative means of attachment, threaded nuts and bolts may be a type of fastener 1127 used to couple slide brackets 1124, 1126 to each base 468, 416 of frame 402 of modular optical unit 602. Accordingly, a set of threaded bolts may be extended through fastener holes formed in each slide bracket 1124, 1126 such that a head of the threaded bolt remains on an outer side of slide bracket 1124, 1126 and the threaded tapered portion of the threaded bolt is extended through the fastener holes formed in each slide bracket 1124, 1126. Upon being inserted therein, the threaded tapered portion of the threaded bolt will protrude outwardly through fastener holes 431 located through each base 468, 416 of frame 402. Subsequently, a nut (not shown) may be placed over each threaded tapered portion of each utilized threaded bolt and the nut may be rotated somewhat so as to secure the slide brackets 1124, 1126 in place to each base 468, 416. According to one or more embodiments, the nut may only be partially rotated so that the slide brackets 1126, 1124 are retained against each base 468, 416 without being fully tightened in place. At this point, upper slide bracket 1124 and lower slide bracket 1126 are secured and coupled to modular optical unit 602 (e.g. by being securely coupled to frame 402).

To install modular optical unit 602 within interior cavity 1118 of housing 104 of light device 102, a human operator may slide upper slide bracket 1124 and lower slide bracket 1126 (simultaneously or one at time alternatively) through upper slide bracket channel 1108 and lower slide bracket channel 1110, respectively. To firmly secure modular optical unit 602 in place after upper slide plate 1124 and lower slide plate 1126 have been installed in each slide bracket channel 1108, 1110, the human operator may fully tighten each nut used to hold each threaded bolt in place, thereby firmly securing modular optical unit 602 in its designated position against backwall 1122. Additionally, one or more lock washers may be used to further retain each nut in place. To further secure the nut and threaded bolt and slide brackets 1124, 1126 and each base 468,414 of frame 402 to each other, any additional locking mechanisms as known in the art may be used including lock washers, jam nuts, and/or specialist adhesive thread-locking fluid.

Those of ordinary skill in the art will appreciate that for maintenance purposes or replacement of one or more components of modular optical unit, disengaging modular optical unit 602 may be achieved by loosening each nut and threaded bolt, pulling out modular optical unit 602 from slide channels 1108, 1110, and removing slide plates 1124, 1126. Thus, it may be possible to regularly inspect, maintain, and repair if necessary modular optical unit 602 using this exemplary process described above for securing modular optical unit 602 to the interior surface of backwall 1122 of housing 104.

In one or more embodiments, an inner top surface 1132 of housing 102 may be generally parallel to bottom surface 1134 of housing 104. In one or more embodiments, bottom surface 1134 may be angled downwardly, as shown in FIG. 11, which may be useful for accommodating the angled and downward orientation of LED driver 854 and support plate 852 when coupled to protruding piece 434 of frame 402.

FIG. 11 may be further helpful in providing additional detail and understanding regarding a construction and assembly of housing 104. In one or more embodiments, housing 104 may include outer top cover 206 (as shown in FIG. 2 as well), whereby outer top cover 206 may be located above inner top surface 1132 of housing 104. Outer top cover 206 may be removeably or permanently mounted to inner top surface 1132 of housing 104. Outer top cover 206 and inner top surface 1132 may, in one or more embodiments, define a cavity 1106. Cavity 1106 may be included to accommodate one or more motor controllers (e.g. motor controller 1502 as shown in FIG. 15) used to control a motor that may be disposed within an interior of motor housing 204. More detail regarding motors and motor controllers will be provided later in the present description, in particular, with respect to FIG. 15.

Further, housing 104 may include additional channels located towards and formed in a front surface 136 of housing 104 for accommodating additional components that may be coupled to housing 104. For example, upper lens channel 1112 and lower lens channel 1114 may be useful for installing a protective lens, such as lens 106 shown in FIG. 1 within housing 104. As shown in FIG. 1, lens 106 may be located in front of each modular optical assembly, such as modular optical assembly 602, that is located within an interior of housing 104 of light device 102.

Additionally, a protective, cosmetic cover, such as cover 116 in FIG. 1, may be coupled to housing 104 at the front side 136 of housing 104 at channels 1160 and 1162. In one or more embodiments, cover 116 may be slid or otherwise disposed in upper and lower cover channels 1162 and 1160, respectively, as shown in FIG. 11. Cosmetic cover 116 may provide a more uniform, aesthetically pleasing appearance, while also providing further protection to lens and other internal components from any liquids, rain, snow, or other environmental conditions that light device 102 may be subject to when mounted on a surface of a vehicle.

Turning to FIG. 12 and FIG. 13, FIGS. 12 and 13 are illustrations of multiple modular optical units connected to each other according to embodiments described in the present disclosure. Each modular optical unit 1202, 1204, 1206, and 1208 shown in FIGS. 12 and 13 may be a modular optical unit in accordance with modular optical unit 602 as previously described. Accordingly, modular optical units 1202, 1204, 1206, and 1208 may include yoke assembly 302, a frame 402 having one or more moveable members (e.g. 442 and 458) for moving optical assembly 502 towards and away from a set of light emitting diodes, such as light emitting diodes 604, and an optical assembly, such as optical assembly 502.

Each modular optical unit 1202, 1204, 1206, and 1208 (or a greater or lesser number of modular optical units) in accordance with modular optical unit 602 may be configured to have a shaft 304 having a connector end 306 and a receiving end 306 disposed on opposite sides of shaft 304. To couple multiple modular optical units within a housing of a light device, such as housing 104 of light device 102, an operator or assembler may position a first modular optical unit 1202 such that a connector end 306 of first modular optical unit 1202 is oriented towards a receiving end 308 of second modular optical unit 1204. Connector end 306 of first modular optical unit 1202 may be matingly engaged with a receiving end 308 of second modular optical unit 1204 by inserting connector end 306 of first modular optical unit 1202 into the receiving end 308 of second modular optical unit 1204. Alternatively, any necessary motion or means of matingly engaging connector end 306 of first modular optical unit 1202 to receiving end 308 of second modular optical unit 1204 may be used, including without limitation sliding, rotating, pushing, twisting, threadably engaging, adhering using one or more adhesives, or using one or more fasteners to fasten connector end 306 of first modular optical unit 1202 to receiving end 308 of second modular optical unit 1204. As shown in FIGS. 12-13, in one or more embodiments, connector end 306 is configured to be inserted and thereby secured within the hollow channel or bore 310 (e.g. as shown in FIG. 3) formed in receiving end 308 of shaft 304. Other techniques for coupling connector end 306 to receiving end 308 may be used as known to those of ordinary skill.

As shown in FIG. 12 and FIG. 13, in one or more embodiments, each modular optical unit, such as modular optical units 1202, 1204, 1206, and 1208 are positioned adjacent to one another and are positioned in linear alignment. To connect the multiple modular optical units, shaft connector end 306 of the shaft 304 disposed on second optical unit 1204 may be inserted into or otherwise connected to receiving end 308 of the shaft 304 disposed in the third modular optical unit 1206. Subsequently, the shaft connector end 306 of shaft 304 as located in the third modular optical unit 1206 may be inserted into or otherwise coupled to the receiving end 308 of the shaft 304, which is disposed in the fourth modular optical unit 1208. It is noted that a housing, such as housing 104, may be selected that has a necessary length to accommodate the number of modular optical units to be installed within the housing 104. As used herein, the length of the housing 104 refers to the longest side of the housing 104. In one or more embodiments, a length of housing 104 may be customized when manufactured to suit the number of modular optical units to be contained in an interior cavity 1118 of housing 104. Further, it may be feasible that the width and height of housing 104 may be uniform even for housing 104 of light device 102 having variable lengths. Alternatively, in one or more embodiments, the width and height of housing 104 may be alterable to best suit multiple modular optical units, such as modular optical units 1202, 1204, 1206, and 1208.

To further verify that multiple modular optical units, such as modular optical units 1202, 1204, 1206, and 1208, are properly coupled and oriented with respect to one another, locator pins 422 may be disposed on one side of frame 402 for each modular optical unit 602 and locator holes 424 may be disposed on an opposite side of frame 402 for each modular optical unit 602. As previously discussed with respect to FIG. 4, in one or more embodiments, four locator pins 422 may be located on a side surface of each of the pair of sidewalls 410 (e.g. first sidewall 412 and second sidewall 414) of frame 402. For example purposes only, and without limitation, two locator pins 422 may be located along and towards a top of each side sidewall, and two locator pins 422 may be located along and towards a bottom side of each of sidewall. On an opposite side of each sidewall, there may be two locator holes 424 (e.g. as shown in FIG. 13) located along and towards a top of each side sidewall, and two locator holes 424 that may be located along and towards a bottom side of each of sidewall. Thus, in one or more embodiments, a frame adapted to be used in a modular optical unit, such as frame 402, may have a set of locator pins (e.g. 422) on one side of frame 402 and a set of locator holes (e.g. 424) that are aligned with each locator pin on the opposite side of frame 402. Those of ordinary skill in the art will appreciate that a greater or lesser number of locator pins 422 and locator holes 424 than those included herein may be located on frame 402.

Locator pins 422 may be configured to assist in positioning one modular optical unit with respect to another. Thus, when second modular optical unit 1204 is brought closer to first modular optical unit 1202 (or vice versa), each locator pin 422 located on frame 402 of second modular optical unit 1204 may be inserted into and fitted into a corresponding locator hole 424 disposed on frame 402 of the first modular optical unit 1202.

As shown in FIGS. 12 and 13, in one or more embodiments, shaft 304 may be positioned within cavity 438 of frame 402 such that receiving end 308 may be located on the same side of frame 402 as locator pins 422. As shown in FIG. 12, receiving end 308 of shaft 302 is on the same side of frame 402 of second modular optical unit 1204 as locator pins 422. Conversely, locator holes 424 may be located on a same side as the connector end 306 of shaft 304 on first modular optical unit 1202 as shown in FIG. 13. Nevertheless, those of ordinary skill in the art will appreciate that in alternative embodiments, a position of locator pins 422 and a position of locator holes 424 may be reversed or otherwise arranged differently.

In addition to the connection methods listed above, in one or more embodiments, each LED driver 854 may include a male connector end, such as male connector end 1302 and a female receiving end, such as female receiving end 1304 (e.g. as shown in FIG. 13), whereby the male connector end 1302 is located on an opposite side of LED driver 854 than the female connector end 1304. As shown in FIG. 13, according to embodiments of the present disclosure, LED driver 854 may be coupled to bracket support plate 852 for each modular optical unit, including modular optical units 1202, 1204, 1206, and 1208. Each LED driver 854 of each modular optical unit may be matingly coupled to the LED driver 854 of another modular optical unit by matingly engaging the designated male connector end 1302 located on each LED driver 854 with a female connector end 1304 disposed on an LED driver 854 of another modular optical unit.

Thus, according to one or more embodiments, each LED driver 854 of each modular optical unit may connect to each LED driver 854 of another modular optical unit. Each shaft 304 of each modular optical unit may connect to a shaft 304 of another modular optical unit in order to assembly multiple modular optical units within a housing 104 of light device 102. Further, in some embodiments, locator pins 422 disposed on one side of a frame (e.g. frame 402) of each modular optical unit may be fitted into corresponding locator holes 424 disposed on another side of a frame of another modular optical unit. Accordingly, the present description provides multiple techniques for connecting multiple modular optical units together. Those of ordinary skill in the art may appreciate that alternative arrangements and structures for connecting modular optical units may be within the scope of the one or more embodiments described herein.

As shown in FIGS. 12 and 13, in one or more embodiments, each modular optical unit is consecutively placed and aligned with respect to each other. Furthermore, to properly orient modular optical units, according to one or more embodiments, it may be desirable to align each modular optical unit such that the last or final modular optic unit to be included within an interior 1118 of housing 104 has the connector end 306 of its shaft 304 accessible. This may be desirable in order for connector end 306 of shaft 304 of the last modular optical unit in a series of modular optical units to be rotatably coupled to a motor located within motor housing 204, which thus provides rotatable motion to each connected shaft 304 thereafter.

Referring back to FIG. 2, housing 104 of light device 102 in FIG. 2 may have, in one or more embodiments, a laterally positioned side surface 210 that is closest to or proximate motor housing 204. Further, housing 104 of light device 102 may have a side surface 212 disposed on an opposite side of housing 104 that is farthest from or distally located away from motor housing 204. According to one or more embodiments for assembling modular optical units within housing 104, in order to be able to rotatably engage each shaft 304 of each modular optical unit (such as units 1202, 1204, 1206, and 1208), the last modular optical unit placed within housing 104 may have its connector end 306 facing side surface 210, which is the side of housing 104 that is closest to motor housing 204. For example, fourth modular optical unit 1208 (e.g. last modular optical unit in a series of modular optical units) may be positioned whereby the connector end 306 of its shaft 304 is oriented to face a side surface 210 of housing 102, and thereby be closest to a motor disposed within motor housing 204. As will be further explained below with respect to FIG. 17, a motor may be located within motor housing 204 and a gear train mechanism (e.g. gear train mechanism 1724) may be used to rotatably couple the motor disposed within motor housing 204 to connector end 306 of shaft 304 in a modular optical unit, such as modular optical unit 1208. Accordingly, every shaft of each modular optical unit being connected together may thus be rotatably engaged with the motor disposed beneath the motor housing 204 as shown in FIG. 2. When the motor is energized and coupled to gear train mechanism 1724, each shaft disposed in the modular optical units that are connected in series will be provided with the rotational motion of the motor.

Figure 14:
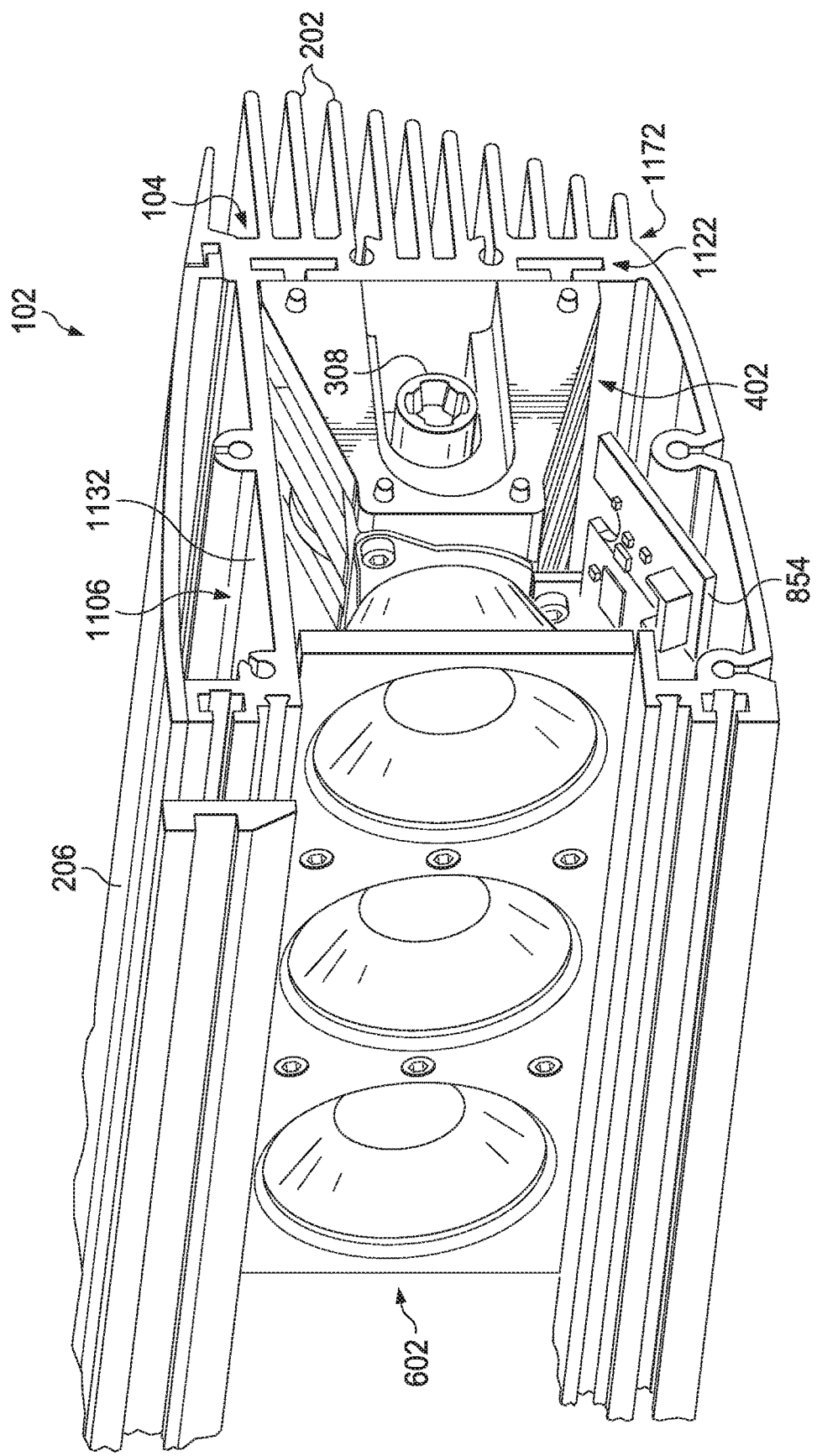
FIG. 14 is an illustration from a perspective side view of a light device and a modular optical unit located therein in accordance with an illustrative embodiment.

Turning to FIG. 14, FIG. 14 shows a perspective side view illustration of light device and a modular optical unit located therein according to embodiments of the present description. As shown in FIG. 14, a first modular optical unit such as modular optical unit 1202 may be oriented such that receiving end 306 of shaft 304 may be located proximate to a lateral side (e.g. later side 212) of housing 104 that is farthest from the motor housing 204 (as shown in FIG. 2). While end cap 124 may not be shown in FIG. 14, in one or more embodiments, when fully assembled, end cap 124 may be coupled to lateral side 212 of housing 104 to provide a protective cover for this lateral side 212 of housing 104. As shown in FIG. 14, set of fins 202 protrude outwardly from the exterior surface 1172 of backwall 1122 of housing 104.

Accordingly, it is noted that when assembling a number of modular optical units, it may be prudent to plan a direction of orientation of each modular optical unit as each unit is initially positioned within housing 104 of light device 102. It is noted each modular optical unit 602 may be oriented such that a front of the modular optical unit 602 (e.g. front of optical assembly 502) is facing towards a front of the housing 104. Further, a first modular optical unit, such as modular optical unit 1202 may be oriented such that receiving end 306 of the shaft 304 located within modular optical unit 1202 is pointing towards a lateral side (e.g. 212) of housing 104 that is farthest away from a motor housing, such as motor housing 204, and/or is also pointed towards end cap 124 of housing 104. Each subsequently connected modular optical unit may be connected whereby the last installed modular optical unit is oriented such that a connector end 306 of shaft 304 of the last modular optical unit (e.g. modular optical unit 1208) is accessible and may be coupled to one or more gear trains for rotatably coupling to a motor disposed within motor housing 104.

Alternatively, it is contemplated that in other embodiments (not shown in Figures), motor housing 204 and a designated motor mounting surface underneath may be located on an opposite side of housing 104 (such as at lateral side 212) and modular optical units may be oriented in a reverse orientation to accommodate such a placement of motor housing 204. In still yet another embodiment, motor housing 204 may be located centrally on a back wall (e.g. back wall 1122) of outer housing 104.

FIG. 14 provides a clear view of cavity 1106 that may be formed in between outer top cover 206 and inner top piece 1132 of housing 104. Outer top cover 206 may be removeably coupled to top piece 1132 of housing 104. In one or more embodiments, outer top cover 206 may be angled upwardly so as to provide more space for a motor controller such as motor controller 1502 in FIG. 15.

FIG. 15 shows a top view of a light device according to embodiments provided in the present description. In one or more embodiments, motor controller 1502 may be coupled to an exterior surface of top piece 1132 of housing 104 and ultimately located within the cavity 1106 formed between outer top cover 206 and top piece 1132 of housing 104 (shown in FIGS. 14 and 15). Motor controller 1502 may be any suitable motor controller known in the art or as yet developed.

Figure 16:
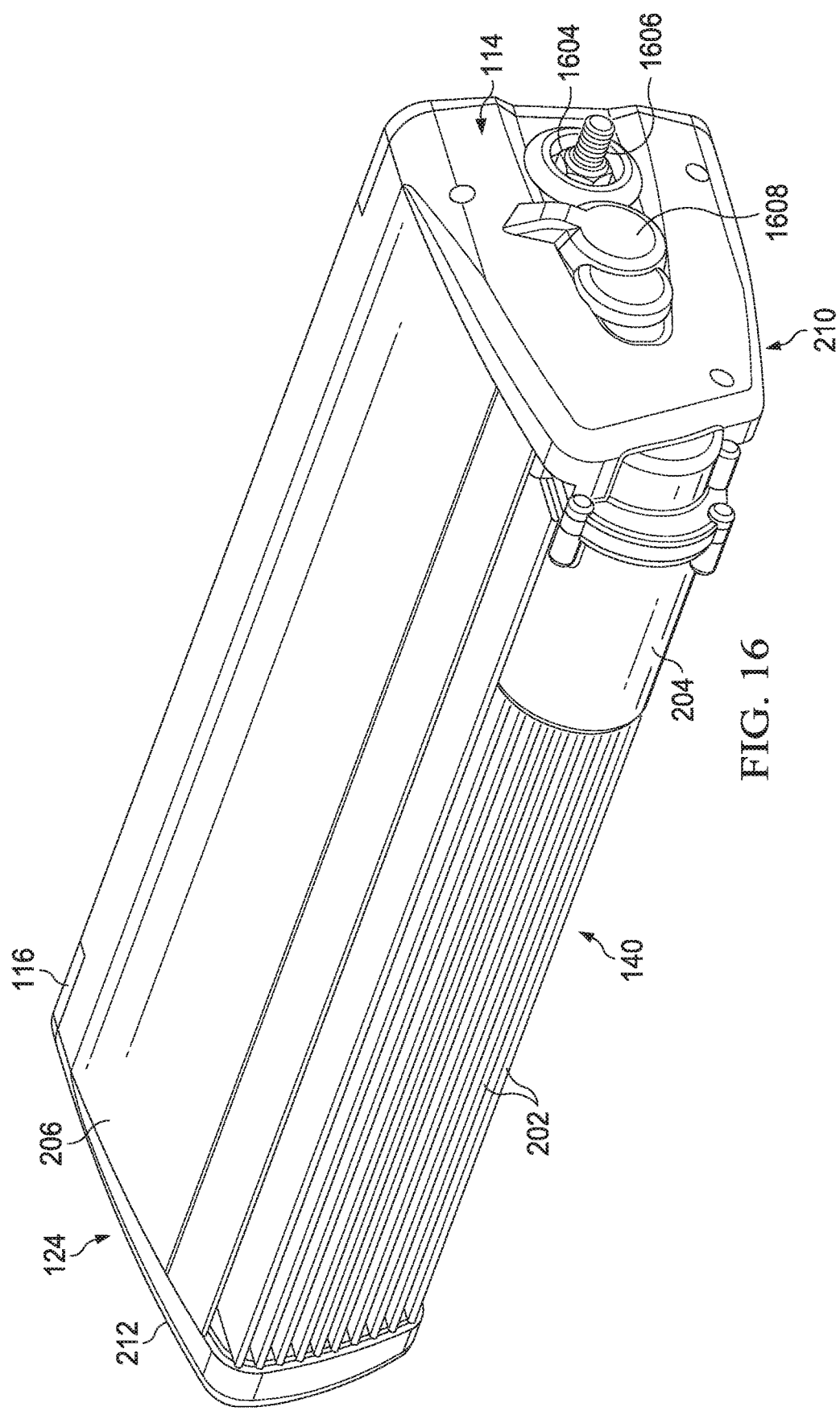
FIG. 16 is an illustration from a perspective view of a rear surface of a light device and an end cap coupled to a side of the light device in accordance with an illustrative embodiment.
Figure 17:
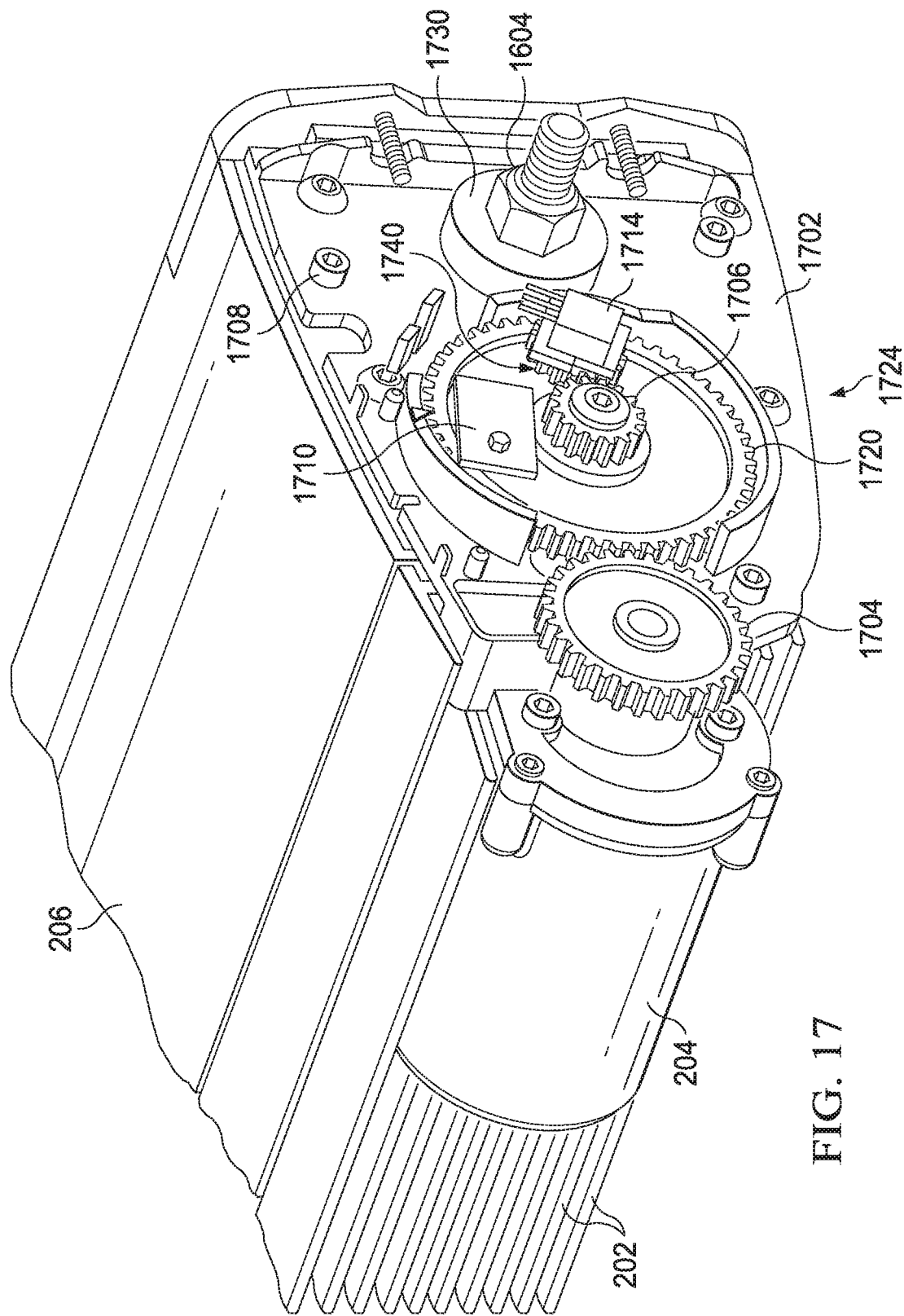
FIG. 17 is an illustration from a perspective view of a rear surface of a light device and a motor gear mechanism in accordance with an illustrative embodiment.

FIGS. 16 and 17 may be useful for illustrating how a motor may be coupled to a housing of light device and to each modular optical unit. FIG. 16 shows a perspective view of a rear surface of a light device and an end cap coupled to a side of the light device according to one or more embodiments described in the present description. FIG. 17 shows a perspective view of a rear surface of a light device without the end cap shown in FIG. 17 according to embodiments provided in the present description.

Light device 102, as shown in FIG. 16, is fully assembled according to one or more embodiments. Light device 102 in FIG. 16 may include an end cap 124 disposed on a distal side (e.g. 212) of light device 102, whereby the distal side may refer to the side of light device 102 and housing 104 that is the farthest from the motor mount surface and motor housing 204.

Further, light device 102 in FIG. 16 has top cover 206 installed in place. While not shown in FIG. 16, a motor controller, such as motor controller 1502 shown in FIG. 15, may be located beneath top cover 206. Further, housing 104 includes backwall 1122 with set of fins 202 mounted on the exterior surface 1172 of backwall 1122 of housing 104. Also, cosmetic cover 116 is also coupled to the front side 136 of housing 104 to cover lens 106 and any modular optical units, such as modular optical unit 602, contained within an interior of housing 104.

End cap 114, as shown in FIG. 16, is a protective cap or cover that may protect one or more interior components located beneath end cap (such as those shown in FIG. 17). End cap 114 may also provide a more aesthetically uniform and appealing appearance to light device 102. End cap 114 includes a designated opening 1606 for a mount hold, such as mount hold 1730 shown in FIG. 17. A mounting bracket (not shown in Figures), in one or more embodiments, may be configured to be attached to light device 102 at mount hold 107 in end cap 124 as shown in FIG. 1 and to mount hold 1730 that is accessible through opening mount hold opening 1606 shown in FIG. 16. In one or more embodiments, such a mounting bracket suitable for light device 102 may be threadably coupled to mount hold 1730 by threadably engaging the mounting bracket to the threaded bolt 1604 shown in FIG. 16. Those of ordinary skill in the art will appreciate other attachment and fixation means may be used as well. Thus, light device 102 may be securely attached to a surface of a designated vehicle.

End cap 114 may be coupled to motor housing 204 using one or more fasteners in one or more embodiments. End cap 114 may be configured to suit a shape and size of housing 104, and may be formed in the dimensions appropriate for enclosing a side of housing 104. End cap 114 may further include additional protective covers 1608 for covering one or more underlying components (e.g. center gear 1720 and potentiometer 1714). In one or more embodiments, end cap 114 may be coupled to a plate, such as plate 1702 as shown in FIG. 17.

As shown in FIG. 17, in one or more embodiments, light device 102 may include a plate, such as plate 1702. Plate 1702 may be a plate surface coupled to a side surface of housing 104 (e.g. via fasteners 1708). Plate 1702 may have one or more gears and other electrical components useful for transferring rotational energy and motion provided by a motor disposed within motor housing 204.

In one or more embodiments, a gear train mechanism, such as gear train mechanism 1724 may be used to rotatably couple a shaft, such as shaft 304 of modular optical unit 602 (and, likewise, modular optical units 1202, 1204, 1206, and 1208). Gear train 1724 may be rotatably mounted on plate 1702 and rotatably coupled to a motor coupled to housing 104 (e.g. a motor disposed beneath motor housing 204 in FIG. 2). When such a motor is energized, gear train 1724 may serve as a motor drive mechanism for transferring rotational motion to one or more shafts 304 of any modular optical units (e.g. 602) disposed within light device 102.

Gear train 1724 may include, in one or more embodiments, motor gear 1704, shaft gear 1706, and center gear 1720. Each gear of gear train 1724 may meshingly engage with a motor coupled to housing 104, e.g. as disposed beneath motor housing 204. Further, each gear of gear train mechanism 1724 may meshingly engage with shaft 304 of each modular optical unit included within an interior 1118 of housing 104. Any gear known in the art (or as yet to be developed) may be utilized as a component of gear train mechanism 724, including, but not limited to, spur gears and/or helical gears, or a combination thereof.

Motor gear 1704 may be coupled to a motor disposed beneath motor housing 204 such that when motor is actuated, the rotational motion provided by a motor is initially transferred to motor gear 1704. Further, shaft gear 1706 may be rotatably coupled to center gear 1720 (the larger central gear). In one or more embodiments, shaft gear 1706 may be rotatably coupled to the connecting end 306 of shaft 304 of modular optical unit 602.

After receiving a transfer of rotational motion from motor gear 1704, center gear 1720 may begin to rotate, thus causing shaft gear 1706 to rotate as well. Responsive to the rotation of shaft gear 1706, shaft 304 may also begin to turn. As previously discussed with respect to FIG. 12 and FIG. 13, the last modular optical unit installed in housing 104 (e.g. modular optical unit 1208) may have its connecting end 306 pointing towards side 210 so as to be accessible and capable of being rotatably coupled to shaft gear 1706. Further, multiple modular optical units modular optical units 1202, 1204, 1206, and 1208) may be connected in series such that each shaft of each modular optical unit rotates (substantially simultaneously) as a result of shaft gear 1706's rotational motion. It is noted that shaft gear 1706, and in turn shaft 304, may rotate in a clockwise or counterclockwise direction as desired.

To further assist in determining a position of shaft 304, potentiometer 1714 may be coupled to plate 1702. Potentiometer 1714 may be coupled to an underlying gear (e.g. 1740) that is in turn coupled to shaft gear 1706. A potentiometer, as known in the art, is a variable resistor. In one or more embodiments, and without limitation, potentiometer 1714 may be used to measure a rotation of a shaft, such as shaft 304. Potentiometer 1714 may be rotatably coupled to shaft gear 1706 (e.g. potentiometer gear 1740 is meshingly engaged with shaft gear 1706). A resistance that is provided from potentiometer 1714 may then be used to indicate a current position of shaft 304.

In addition to the above, a tact switch, such as tact switch 1710 may also be coupled center gear 1720, and may be used to determine an initial position of shaft 304. Tact switch 1710 may be any type of tact switch as known in the art or as yet to be developed.

The following portion of the present description may include a system and process for power distribution and data transfer among one or more components of light device 102 according to one or more embodiments. Referring back to FIG. 2 and as shown in FIG. 15, light device 102 may include cable mount passage 110 in an end cap, such as end cap 124 of light device 102. As previously discussed, cable mount passage 110, in one or more embodiments, may include cable opening 111 and cable opening 113.

In one or more embodiments, it may be desirable for light device 102 to be in electric communication with the vehicle battery of the vehicle to which light device 102. Accordingly, one or more wires may be used to connect the vehicle battery with light device 102 by running the wires through an opening, such as cable opening 111. It is noted that those of ordinary skill in the art will appreciate that alternative power sources may be utilized, including, without limitation, any number of batteries, including solar powered batteries, disposed within light device 102.

In one or more embodiments, wires passed through cable opening 111 may initially be connected to an LED driver, such as LED driver 854 of modular optical unit 602. Accordingly, power may be distributed and supplied to each light emitting diode 604 coupled to each LED driver 854. In one implementation, a cable may be connected between a power source and one of the LED drivers of a modular optical unit, and then each LED driver of each modular optical unit thereafter may be coupled to the other, such that power may be transmitted to each modular optical unit and to each LED driver. Those of ordinary skill will understand that alternative configurations may be implemented as well.

To transfer power to a motor coupled to light device (e.g. at 204), in one or more embodiments, wires or cables may be used to connect motor controller 1502 to the LED driver 854 that is coupled to the power source (e.g. vehicle battery) within the vehicle. Thus, power may be transmitted via motor controller 1502 to the motor, so that motor controller 1502 may be in electric communication with the motor disposed beneath housing 204 of light device 102. To achieve this, in one or more embodiments, one or more wires may be used to connect the motor to motor controller 1502.

In one or more embodiments, motor controller 1502 may be in signal communication with potentiometer 1714. For example, one or more wires may be used to connect potentiometer 1714 to motor controller 1502. Any data provided by potentiometer 1714 to motor controller 1502 (e.g. a resistance of potentiometer 1714) may be processed by motor controller 1502 and interpreted to determine a current position of shaft 304 (which may be rotatably coupled to shaft gear 1706 and to potentiometer 1714). Motor controller 1714 may thus be used to process data that is output from potentiometer 1714. Further, one or more wires may be connected from motor controller 1502 to a tact switch, such as tact switch 1710, in order to transfer any data from tact switch 1710 to be processed by motor controller 1502.

According to one or more embodiments, when light device 102 is powered on, the motor (or set of motors) of light device 102 may automatically drive in a predetermined direction until a bump in the shaft gear 1706 makes contact with and hits tact switch 1710. Once tact switch 1710 is activated, motor controller 1502 may read a resistance of potentiometer 1714 at this initial position. Motor controller 1502 may identify this initial position as "home". In one or more embodiments, potentiometer 1714 may be configured to spin in a 1:1 ratio with shaft gear 1706 and, by extension, shaft 304. As the motor rotates shaft 304, the changing resistance of potentiometer 1714 may be monitored by motor controller 1502.

As previously discussed, in order for a user to select a desired light output of light emitting diodes 604 (e.g. floodlight or spotlight), a controller (not shown) may be coupled to light device 102. According to one or more embodiments, a connection between light device 102 and the controller may be either wired or wireless using any wireless technology known in the art or as yet to be developed. In one or more embodiments, whereby the controller is coupled via wires to light device, one or more wires may be passed through cable opening 113 in cable passage mount 110 to connect the controller to light device 102, and specifically to motor controller 1502. The associated controller may have a set of buttons or other selectors known in the art and one or more user input interfaces that allows a user to select the desired angle of light spread for the light output produced by the one or more light sources within light device 102.

Any position information obtained when light device 102 is initially powered on with respect to a position of shaft 304 may be communicated to the controller. Subsequently, data may be transmitted from the associated user controller to motor controller 1502 to change a position of shaft 304 so as to produce the desired light output (e.g. desired angle of light spread). Responsive to receiving a command to change a current position of shaft 304, motor controller 1502 may transmit one or more data commands to the motor in order for motor to rotate either in a forward or reverse direction. Accordingly, a controller may be in signal communication with motor controller 1502 and may allow a user to control the light device in real time.

Figure 18:
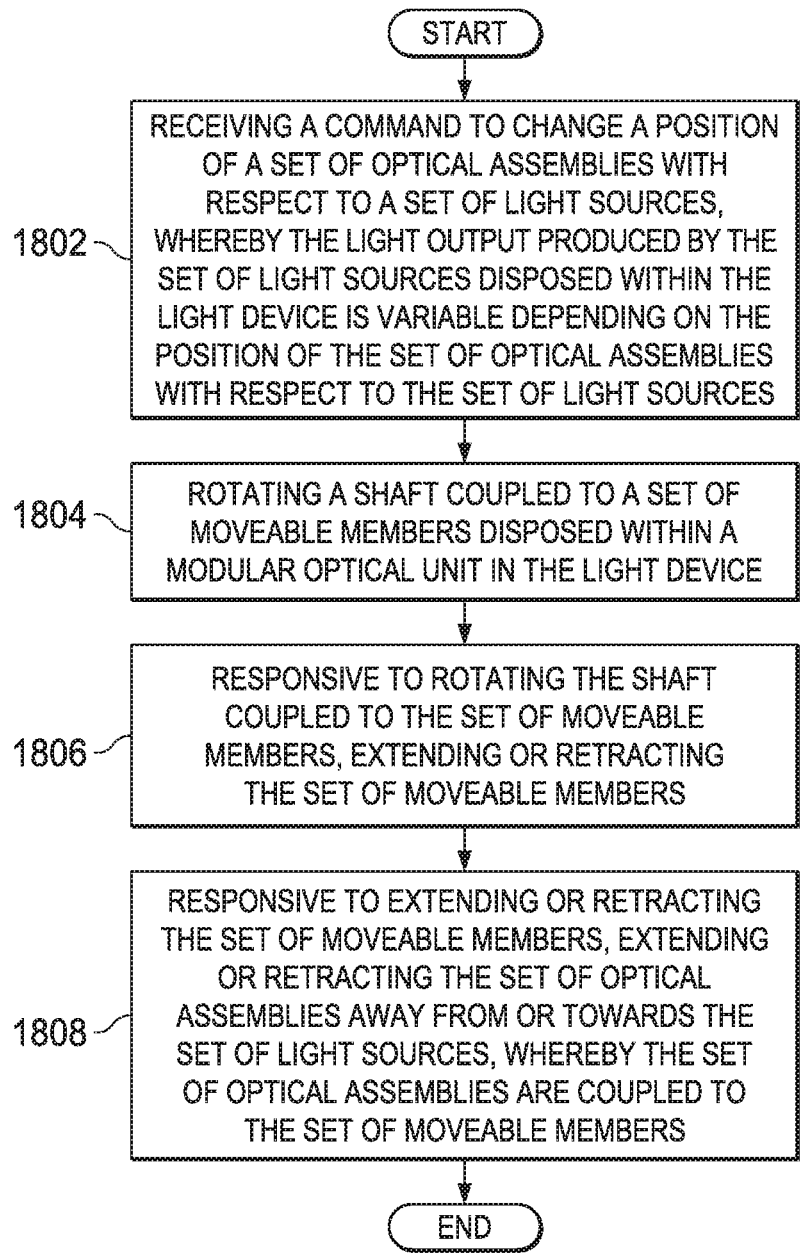
FIG. 18 is a flowchart illustrating a process for operating a light device coupled to a surface of a vehicle.

Turning to FIG. 18, FIG. 18 is a flowchart illustrating a process for operating a light device coupled to a surface of a vehicle. In one or more embodiments, the process described in FIG. 18 may utilize one or more components of light device 102 as described above. Further, light device 102 may include one or more components shown in FIGS. 1-17 and described above, including modular optical unit 602 as shown in FIG. 6.

The process may begin by making a determination whether a command was received to change a position of a set of optical assemblies with respect to a set of light sources, wherein the set of optical assemblies and the set of light sources are enclosed within a modular optical unit (step 1802). Further, the modular optical unit may be located within a housing of the light device, whereby the light device may be securely coupled to a surface of a vehicle (e.g. on an interior or exterior of a vehicle, as well within an interior body of a frame of the vehicle). The set of light sources within the light device may produce a light output. Next, the process may include rotating a shaft coupled to a set of moveable members disposed within the modular optical unit (step 1804). The process may continue such that the set of moveable members are extended or retracted responsive to rotating the shaft coupled to the set of moveable members (step 1806). Subsequently, responsive to extending or retracting the set of moveable members, the set of optical assemblies may be extended or retracted (step 1808) towards the set of light sources. The process may terminate thereafter or may be continuously repeated to suit the needs of the user.

Many desirable benefits are provided by one or more functions of a light device or light fixture as described in the present description. A light device, as described above, may be used to produce a flood light or a spotlight, and to further illuminate an area of road or highway that is being driven upon. Notably, a light device as described herein may be useful for any type of user. For example purposes, and without limitation, police, fire, emergency personnel may find such a light device particularly useful for providing either a wider-angle floodlight to better illuminate a broad area or to shine a more narrow focused spotlight at a scene of interest. In addition, off-road vehicle drivers and operators may find such a light device particularly useful. Off-road vehicles frequently venture onto roads that are uneven and unpaved at relatively high speeds. Being able to switch between a floodlight and a spotlight produced by a same light device may enable such off-road vehicles to manage such uneven terrain at high speeds much better than before. Nevertheless, as previously stated, one or more embodiments of a light device as described in the present description may have any number of applications and benefit a variety of users, including the non-commercial, average driver of a non-commercial vehicle.

The flowchart and block diagrams in the figures illustrate the architecture, functionality, and operation of possible implementations of the resonating power transfer system according to various embodiments. The detailed description of the illustrative embodiments above is described in sufficient detail to enable those skilled in the art to practice the invention. To avoid unnecessary detail, the description may have omitted certain information known to those skilled in the art.

Although the illustrative embodiments described herein have been disclosed in the context of certain illustrative, non-limiting embodiments, it should be understood that various changes, substitutions, permutations, and alterations may be made to these embodiments without departing from the broader sprit and scope of the invention as set forth in the claims. It is also understood that other embodiments may be utilized and that logical structural, mechanical, chemical, and/or electrical changes may be made without departing from the spirit or scope of the invention.

What is claimed is:

1. An illumination apparatus adapted to be coupled to a surface of the vehicle, the illumination apparatus comprising:
 a housing;
  a set of modular optical units disposed within the housing,
   the set of modular optical units further comprising:
    a frame;
    at least one light source mounted on the frame and configured to produce a light output;
    a faceplate;
    at least one optical assembly including at least one optical component coupled to the faceplate; and
    a yoke assembly including a shaft having a set of cams, and a yoke having a set of lobes, the yoke connected to the faceplate and slideably coupled to the frame and
    wherein rotation of the shaft causes the at least one optical assembly to move towards and away from the at least one light source,
    wherein the light output is adjustable depending on a position of the at least one optical assembly with respect to the at least one light source.

2. The illumination apparatus of claim 1, wherein the frame further comprises a hollow cavity defined on a backside of the frame, wherein the yoke assembly is disposed within the hollow cavity and wherein the yoke is secured to the backside of the frame.

3. The illumination apparatus of claim 1, wherein the set of light sources are a set of light emitting diodes, and a set of light emitting diode caps are utilized to secure the set of light emitting diodes to the frame.

4. The illumination apparatus of claim 1, wherein the yoke further comprises a bar that connects the set of lobes, the set of lobes including a cavity within each of the set of lobes.

5. The illumination apparatus of claim 4, wherein each cam is received within a corresponding cavity of the set of lobes, such that the shaft is configured to rotate about the inner perimeter of the corresponding cavity of the set of lobes.

6. The illumination apparatus of claim 1, wherein the at least one optical component is configured to fit over the at least one light source such that the at least one optical component covers the at least one light source when the at least one optical assembly is in a retracted position.

7. The illumination apparatus of claim 6, wherein the at least one optical component further comprises a total internal reflector (TIR) optic having a plano-convex lens embedded therein and a hollow channel formed in a rear portion of the TIR optic.

8. The illumination apparatus of claim 1, wherein the frame comprises:
 a body having a frontside, a backside, and a pair of sidewalls, wherein the frontside of the body of the frame further comprises:
  a set of mounting surfaces adapted to receive the set of light sources; and
  a set of channels and a set of moveable members received within the set of channels, wherein the backside of the body of the frame further comprises:
   a recessed interior portion, wherein the recessed interior portion joins the pair of sidewalls to define a hollow cavity.

9. The illumination apparatus of claim 8, wherein the pair of side walls further comprise:
 a set of raised surfaces spaced apart from each other and protruding outwardly from each of the pair of sidewalls; and
 a set of apertures formed in the set of raised surfaces, wherein a portion of the set of lobes disposed on the yoke protrude through the set of apertures when the yoke is coupled to the frame.

10. The illumination apparatus of claim 1, wherein a first modular optical unit of the set of modular optical units is configured to be connected to a second modular optical unit of the set of modular optical units, and wherein the set of modular optic units is positioned in series and in linear alignment within the housing.

11. The illumination apparatus of claim 10, wherein a length of the housing is selected to fit the set of modular optical units.

12. The illumination apparatus of claim 10, wherein the shaft comprises a connector end and a receiving end, wherein the connector end of the shaft of the first modular optical unit configured to be connected to the receiving end of the shaft of the second modular optical unit.

13. The illumination apparatus of claim 10, wherein each of the set of modular optical units comprises a set of locater pins on one side of the frame and a set of locater pin holes on an opposite side of the frame, wherein the set of locater pins of the first modular optical unit is configured to fit into the set of locater pin holes disposed on the second modular optical unit.

14. The illumination apparatus of claim 1, further comprising a motor secured to the housing and configured to rotate the shaft.

15. The illumination apparatus of claim 14, further comprising:
a motor controller coupled to the housing and configured to transmit power supplied by a connected power source to the motor; and
a gear train coupled to the motor and rotatably coupled to the shaft.

16. The illumination apparatus of claim 15, further comprising a potentiometer coupled to the shaft gear to provide data regarding a position of the shaft to the motor controller.

17. A method for assembling a light device, comprising:
providing a housing of the light device, wherein the housing further comprises a dedicated location adapted for a motor, wherein the light device is configured to be coupled to a surface of a vehicle;
providing a set of modular optical units to be disposed within an interior of the housing of the light device, wherein each modular optical unit of the set of modular optical units further comprises an optical assembly, a frame, and a shaft, wherein said shaft for each modular optical unit of the set of modular optical units comprises a connecting end and a receiving end, the connecting end and the receiving end being located on opposite sides of the shaft; and
orienting each modular optical unit of the set of modular optical units in a desired orientation within the housing, comprising:
positioning a first modular optical unit proximate a distal side of the housing, wherein the distal side of the housing is generally farthest from the dedicated location adapted for the motor, further comprising:
orienting the first modular optical unit such that an optical assembly of the first modular optical unit is oriented towards a front side of the housing, wherein the receiving end of a shaft disposed within the first modular optical unit is positioned closest to the distal side of the housing;
coupling a second modular optical unit to the first modular optical unit, further comprising:
positioning the second modular optical unit adjacent to the first modular optical unit, wherein an optical assembly of the second modular optical unit is oriented towards the front side of the housing;
coupling a receiving end of a shaft disposed within the second modular optical unit with the connector end of the shaft disposed within the first optical unit; and
repeating coupling additional modular optical units until a last modular optical unit is positioned within the housing,
wherein the last modular optical unit is positioned such that a connecting end of a shaft disposed within the last modular optical unit is pointing towards a side of the housing that is proximate to the dedicated location adapted for the motor,
wherein the connecting end of the shaft of the last modular optical unit is capable of being rotatably coupled to the motor.

18. The method of claim 17, further comprising, rotatably coupling the connecting end of the shaft disposed within the last modular optical unit to the motor using one or more gears that are rotatably coupled to the motor.

19. The method of claim 17, further comprising, coupling a connecting end of an LED driver of the first modular optical unit with a receiving end of an LED driver of the second modular optical unit.

20. A method of operating a light device in a vehicle, comprising:
receiving a command to change a position of a set of optical assemblies with respect to a set of light sources,
wherein the set of optical assemblies and the set of light sources are enclosed within a modular optical unit, the modular optical unit being located within a housing of the light device, the light device being coupled to a surface of a vehicle, wherein the set of light sources produce a light output;
rotating a shaft, wherein the shaft is coupled to a set of moveable members disposed within the modular optical unit;
responsive to rotating the shaft coupled to the set of moveable members, extending or retracting the set of moveable members; and
responsive to extending or retracting the set of moveable members, extending or retracting the set of optical assemblies in a linear direction away from or towards the set of light sources,
wherein the set of optical assemblies are coupled to the set of moveable members,
wherein the light output produced by the set of light sources disposed within the light device is variable depending on the position of the optical assembly with respect to the set of light sources.

21. The method of claim 20, wherein an angle of the light spread of the light output is variable, wherein a narrow angle light spread or spotlight is produced when the at least one optical component is extended away from the at least one light source, and further wherein a wide angle light spread or floodlight is produced when the at least one optical component is retracted towards the at least one light source.

22. The method of claim 20, wherein rotating a shaft coupled to a set of moveable members disposed within the modular optical unit further comprises:
rotating a set of cams attached to or integrated with the shaft;
rotating the set of cams around an inner perimeter of a set of lobes on a yoke, wherein the shaft is disposed within the set of lobes of the yoke such that the set of cams contact an inner surface of the set of lobes;
responsive to rotating the attached set of cams, shifting a position of the yoke linearly in a forward or backward direction; and
responsive to the shifting of the position of the yoke linearly in the forward or backward direction, extending or retracting the set of moveable members, wherein the set of moveable members are coupled to the yoke.

23. The method of claim 20, further comprising:
actuating a motor;
turning a gear train mechanism, wherein the gear train mechanism is rotatably coupled to the motor; and
responsive to the turning of the gear train, rotating the shaft, wherein the shaft is rotatably coupled to the gear train.

24. The method of claim 20, further comprising:
receiving input from a controller in signal communication with the light device, wherein the input from the controller provides data regarding a desired position of the set of optical assemblies with respect to the set of light sources.

25. The method of claim 20, further comprising:
providing data regarding a current position of the shaft by transmitting a resistance of a potentiometer, wherein the potentiometer is rotatably coupled to the shaft, wherein the resistance from the potentiometer corresponds to the current position of the shaft.

\* \* \* \* \*